(12) United States Patent
Bai et al.

(10) Patent No.: US 11,251,417 B2
(45) Date of Patent: Feb. 15, 2022

(54) METHODS AND APPARATUS FOR CONTROLLING ELECTRODEPOSITION USING SURFACE CHARGE PROPERTIES

(71) Applicant: Massachusetts Institute of Technology, Cambridge, MA (US)

(72) Inventors: Peng Bai, Cambridge, MA (US); Martin Z. Bazant, Wellesley, MA (US); Fikile R. Brushett, Cambridge, MA (US); Jihyung Han, Jeju-do (KR); Miao Wang, Cambridge, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 106 days.

(21) Appl. No.: 15/951,940

(22) Filed: Apr. 12, 2018

(65) Prior Publication Data

US 2018/0233733 A1    Aug. 16, 2018

Related U.S. Application Data

(63) Continuation of application No. PCT/US2016/061836, filed on Nov. 14, 2016.
(Continued)

(51) Int. Cl.
*H01M 4/36* (2006.01)
*H01M 4/137* (2010.01)
(Continued)

(52) U.S. Cl.
CPC ........ *H01M 4/137* (2013.01); *B01D 67/0088* (2013.01); *B01D 69/12* (2013.01);
(Continued)

(58) Field of Classification Search
CPC .......... H01M 4/137; H01M 4/02; H01M 4/13; H01M 4/366; H01M 4/602;
(Continued)

(56) References Cited

U.S. PATENT DOCUMENTS

2007/0020501 A1 * 1/2007 Li ......................... H01B 1/122
429/443
2008/0070104 A1    3/2008 Lin et al.
(Continued)

FOREIGN PATENT DOCUMENTS

JP    2000067870 A  *  3/2000
KR    100827248 B1  *  5/2008

OTHER PUBLICATIONS

International Search Report and Written Opinion dated Jan. 23, 2017 for International Application No. PCT/US2016/061836, 6 pages.

*Primary Examiner* — Jane J Rhee
(74) *Attorney, Agent, or Firm* — Smith Baluch LLP

(57) ABSTRACT

Surface conduction in porous media can drastically alter the stability and morphology of electrodeposition at high rates, above the diffusion-limited current. Above the limiting current, surface conduction inhibits growth in the positive membrane and produces irregular dendrites, while it enhances growth and suppresses dendrites behind a deionization shock in the negative membrane. The discovery of uniform growth contradicts quasi-steady "leaky membrane" models, which are in the same universality class as unstable Laplacian growth, and indicates the importance of transient electro-diffusion or electro-osmotic dispersion. Shock electrodeposition could be exploited for high-rate recharging of metal batteries or manufacturing of metal matrix composite coatings.

22 Claims, 25 Drawing Sheets

Related U.S. Application Data

(60) Provisional application No. 62/255,141, filed on Nov. 13, 2015.

(51) Int. Cl.
| | |
|---|---|
| *H01M 4/02* | (2006.01) |
| *B01D 67/00* | (2006.01) |
| *H01M 4/13* | (2010.01) |
| *B01D 69/12* | (2006.01) |
| *H01M 4/60* | (2006.01) |
| *C25D 1/00* | (2006.01) |

(52) U.S. Cl.
CPC ............... *H01M 4/02* (2013.01); *H01M 4/13* (2013.01); *H01M 4/366* (2013.01); *H01M 4/602* (2013.01); *B01D 2313/345* (2013.01); *B01D 2325/14* (2013.01); *B01D 2325/16* (2013.01); *B01D 2325/42* (2013.01); *C25D 1/006* (2013.01); *H01M 2004/021* (2013.01); *H01M 2004/027* (2013.01); *H01M 2004/028* (2013.01)

(58) Field of Classification Search
CPC ..... H01M 2004/021; H01M 2004/027; H01M 2004/028
See application file for complete search history.

(56) References Cited

U.S. PATENT DOCUMENTS

| | | | |
|---|---|---|---|
| 2010/0173224 | A1 | 7/2010 | Schlenoff |
| 2011/0166471 | A1 | 7/2011 | Drew et al. |
| 2013/0327249 | A1* | 12/2013 | Winter .................. H01M 4/622 106/163.01 |
| 2014/0242376 | A1 | 8/2014 | Dressick et al. |
| 2015/0024251 | A1 | 1/2015 | Visco et al. |

\* cited by examiner

METHODS AND APPARATUS FOR CONTROLLING ELECTRODEPOSITION USING SURFACE CHARGE PROPERTIES

CROSS-REFERENCES TO RELATED APPLICATIONS

This application is a continuation application of International Application No. PCT/US2016/61836, filed Nov. 14, 2016, entitled "METHODS AND APPARATUS FOR CONTROLLING ELECTRODEPOSITION USING SURFACE CHARGE PROPERTIES," which claims priority to U.S. provisional application Ser. No. 62/255,141, filed Nov. 13, 2015, entitled "METHODS AND APPARATUS FOR CONTROLLING ELECTRODEPOSITION USING SURFACE CHARGE PROPERTIES," the entire disclosure of which is incorporated herein by reference in its entirety.

BACKGROUND

Electrodeposition is difficult to control and attaining a good coating using electrodeposition is challenging, with various undesirable outcomes including dendrite and void formations. Therefore it is useful to have more control when employing electrodeposition in general.

Many industrial processes rely on electrodeposition to make smooth metal coatings, but uniform electroplating is often unstable to the growth of finger-like dendrites. For over three decades, dendritic copper electrodeposition has been studied as an example of diffusion-limited fractal growth, although it has become clear that electric fields and fluid flows also play important roles. In addition, pattern formation by electrodeposition has interested scientists in recent decades since the mechanism of copper dendritic growth was first attributed to diffusion-limited aggregation. Moreover, morphology selection is also influenced by electromigration and convection in free solutions.

SUMMARY

In various embodiments, the present disclosure is directed to, inter alia, methods and apparatus for controlling electrodeposition using surface charge properties, and articles prepared using controlled electrodeposition. In some embodiments, the present disclosure is directed to an electrode comprising a metal and a porous membrane disposed on a surface of the metal, wherein the pores in the porous membrane are coated with a polyelectrolyte. In some embodiments, the metal is Cu, Na, Li, K, or Mg. In some embodiments, the metal is Li. In some embodiments, the polyelectrolyte coating in the pores of the porous membrane is a negative polyelectrolyte. In some embodiments, the polyelectrolyte coating in the pores of the porous membrane is a positive polyelectrolyte. In some embodiments, the present disclosure is directed to a rechargeable battery comprising the electrode described herein. In some embodiments, the negative polyelectrolyte of the electrode is an anionic polymer. In some embodiments, the anionic polymer of the electrode includes poly(acrylic acid), poly(methacrylic acid), polystyrenesulfonate, copolymers thereof, and combinations thereof. In some embodiments, the positive polyelectrolyte of the electrode is a cationic polymer. In some embodiments, the cationic polymer is a poly(allylamine) salt, a polystyrene amine salt, copolymers thereof, and combinations thereof. In additional embodiments, the present disclosure is directed to methods of controlling electrodeposition of materials, including metals and non-metals by controlling surface conduction, e.g., by controlling the surface charge on porous media. In some embodiments, the absolute value of the surface charge of the coated porous membrane ranges from about 0.2 to about 0.8 $e/nm^2$ (i.e., about −0.2 to about −0.8 $e/nm^2$ for negatively charged surfaces, and about 0.2 to about 0.8 $e/nm^2$ for positively charged surfaces).

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
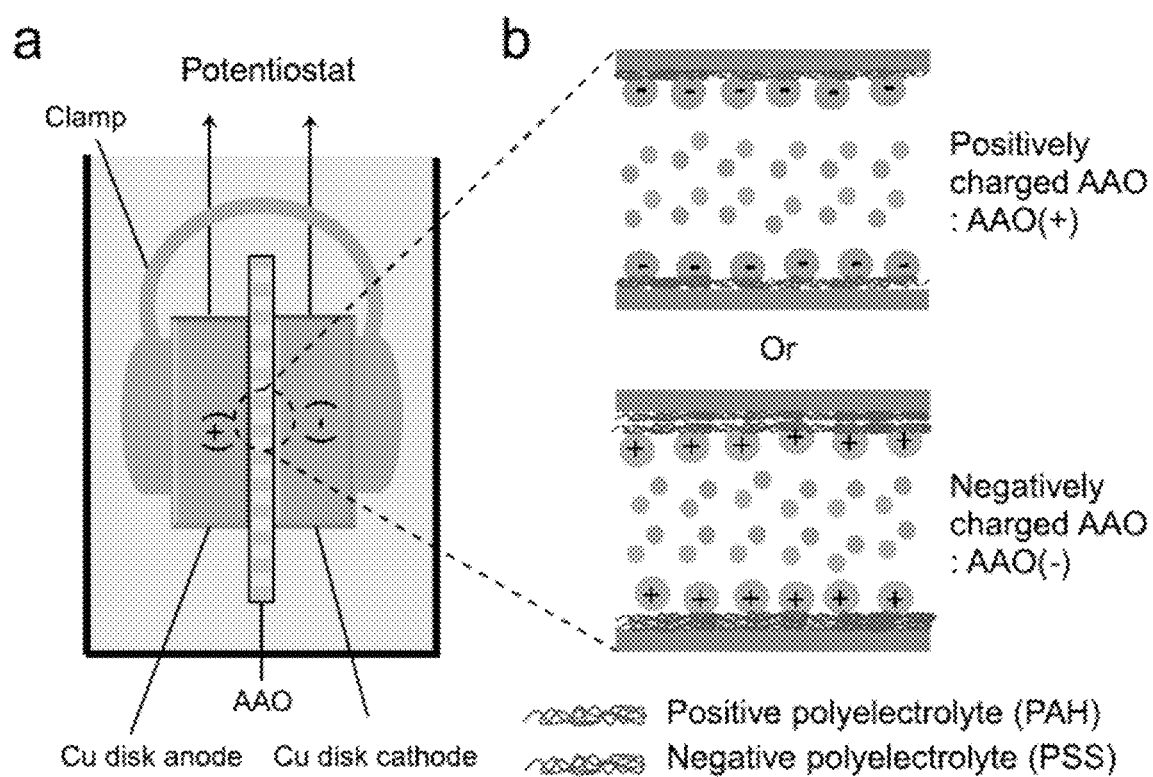
FIG. 1: (a) Cell configuration in $CuSO_4$ solution: Cu cathode/polyelectrolyte-coated AAO/Cu anode. (b) Nanopore EDL structure. The EDL counter-ions contributing to surface conductivity are displayed as larger circles than the bulk ions.

The present disclosure is directed to methods and apparatus for controlling electrodeposition using surface charge properties, and articles prepared using controlled electrodeposition, including the surprising effects of electromigration on electrodeposition in weakly charged porous media, including stabilizing the growth and eliminating dendrites at high charge rates. Copper and gold electrodeposition in porous templates is widely used to make integrated microelectronic circuits, and the invention described herein can guide this process by controlling the charge of the template materials. The methods of controlling electrodeposition described herein, by controlling the surface charge of porous media are suitable for the electrodeposition of any type of material amenable to such process, including metals and non-metals.

In some embodiments, the present disclosure is directed to electrodes. Such electrodes can comprise any suitable metal, for example Cu, Li, Na, K, Mg, Zn, Au, Ni, Al, Cr, Cd, and Fe, either in the form of a pure metal, or an alloy, such as steels or any other alloy, intercalation compound, etc. Such electrodes are useful in batteries, such as rechargeable batteries.

In some embodiments, the methods described herein can provide uniform space-filling nickel electrodeposition into porous or granular ceramic metals that can provide bonding for abrasive products. Such resulting "metal-matrix composites" from surface-controlled deposition described herein can be used as anti-corrosion coatings.

In some embodiments, the methods described herein can provide growing non-metallic products by electrodeposition from electrolytes in porous media, guided by surface conduction. This technology can be applied to producing conversion batteries, such as the cathode of lithium-air battery to guide $Li^+$ to combine with dissolved oxygen to form lithium peroxide $Li_2O_2$ (a poor electronic conductor). Thus, the methods of the present disclosure are not limited to controlling the electrodeposition of metals, but can also be used in the preparation of nonmetals and even poorly or non-conducting materials. For example, surface conduction can be used to control the migration of $Li^+$ ions, which when reacted with dissolved oxygen, can form a deposit of $Li_2O_2$ (a poor electrical conductor), which are useful in conversion batteries. This approach can be used more generally to control the migration of electroactive species in solution, which can subsequently react with other species dissolved in the solution, to form products which need not be good conductors.

In some embodiments, surface charge can be modified by various methods, for example, by varying the pH of the solution with a buffer to move the solution past the isoelectric point of the surface, by silanization (adsorption of different silane molecules) on surfaces such as silica, silicon carbide, which have natural silica oxide films, alumina, etc., and by layer-by-layer incorporation of charged polymers, such as positively charged polydiallyldimethylammonium chloride (pDADMAC) or other positively charged polyelectrolytes such as poly(allylamine hydrochloride) (PAH). In some embodiments, the positive electrolyte such as PAH is directly deposited on the porous media, such as air plasma-treated AAO, to confer a positive surface charge, AAO(+). A negatively charged surface such as AAO(−) is obtained by depositing negatively charged polyelectrolytes (e.g., poly (styrenesulfonate), PSS) on the e.g. PAH-coated AAO.

Suppressing the formation of dendrites in the electrodes of secondary (or rechargeable) batteries is a critical challenge, particularly for lithium batteries such as lithium-ion and lithium-air batteries using lithium metal anodes, in order to prevent capacity losses and catastrophic short circuits during recharging, which can be mitigated by electrolyte design or nanostructured separators and surface layers.

Alternatively, the formation of dendritic short circuits can also be exploited for sensing and information storage, if well controlled at the nanoscale. Dynamical control of electrodeposition is also critical for the fabrication of nanostructures, nano-electronics, 3D integrated circuits, and 3D batteries.

The embodiments described herein generally relate to methods and apparatus for controlling electrodeposition using surface charge manipulation and properties, and articles prepared using controlled electrodeposition.

Dendritic growth allows an electrode to overcome diffusion limitations at high currents by focusing the ionic flux on rapidly advancing dendrite tips. In an unsupported binary electrolyte, driving current into a cation-selective surface, such as an electrode or membrane, depletes the salt concentration, as cations are removed and anions repelled to maintain electroneutrality. Classical theories of ionic concentration polarization predict a diffusion-limited current, but "over-limiting current" (OLC) faster than diffusion has long been observed in electrodialysis and nanofluidics, and investigated for desalination and fuel cells.

Theoretical mechanisms for OLC involve either electrochemical reactions or transport processes other than electrodiffusion that replenish the salt concentration. Electrochemical mechanisms include water splitting and current-induced membrane discharge. A fundamental hydrodynamic mechanism observed in electrodialysis and nanofluidics is the electro-osmotic instability (EOI). The EOI results from second-kind electro-osmotic slip in the electric double layer (EDL) on the ion-selective surface, leading to convection and chaotic flows. EOI has been observed near a membrane with tracer particles and near a single nanoslot with fluorescent molecules and is affected by inhomogeneous conductivity. In microchannels, multiple vortices and concentration plateaus have been observed in the ion depletion region, which do not occur in an unconfined electrolyte, according to theory and experiments.

Under confinement in a channel or pore with charged surfaces, transitions from EOI to two new mechanisms for OLC, electro-osmotic flow (EOF) and surface conduction (SC) transpire as the channel thickness is decreased. The EOF mechanism is based on surface convection that leads to "wall fingers" of salty fluid reaching the membrane without diffusive mixing. The first experimental evidence for the EOF mechanism was accomplished using a silica glass frit, where surface convection leads to "eddy fingers" in the porous network. A hallmark of the EOF mechanism is the persistence of OLC if the sign of the surface charge is flipped, thereby reversing the EOF vortices. According to the theory, EOF plays a larger role than EOI in microchannels, but SC should dominate in nanochannels where transverse diffusion suppresses surface convection. This transition is suggested by microfluidic particle-tracking experiments, but the SC mechanism remains to be confirmed experimentally.

Without probing the dynamics at the pore scale, it can be shown that charged nanoporous polymer/ceramic separators can help to stabilize electrodeposition in rechargeable lithium metal batteries. The introduction of ceramic particles or porous solids with tethered ionic-liquid anions can be shown to improve cycle life by reducing dendritic growth. Besides mechanical blocking of dendrites, without being restricted to a particular mechanism, it is conjectured that dendritic instability is suppressed by the reduction of space charge at the metal/solution interface. This hypothesis refers to yet another mechanism for OLC, the formation of an extended non-equilibrium double layer, which could theoretically occur at a membrane or electrode, but only in the absence of EOI. Indeed, the electro-convection observed at dendrite tips is inconsistent with extended space charge and is likely attributable to EOI since the linear growth instability can be explained by electro-neutral diffusion. Recently, uniform background charge has been added to the electro-neutral linear stability analysis and found that negative charge enhances the stability of cation electrodeposition. This different explanation of the previous results is consistent with the predicted stability of the deionization shock (or "diffusive wave") that would precede the growth in a negatively charged porous medium or microchannel. The precise role of surface charge on electrodeposition in porous media, however, is neglected by existing models and remains to be established experimentally.

As described herein, electrochemical and visual evidence are provided that SC is the dominant mechanism for OLC in nanopores and investigate its effects on electrodeposition. The exemplary model system described herein is a commercial anodized aluminum oxide (AAO) membrane with nano-sized straight parallel pores (300-400 nm in diameter, 60 μm in thickness, 0.25-0.50 in porosity) whose surface charge is modified with multiple layers of charged polyelectrolytes and used as a template for copper electrodeposition from copper(II) sulfate (CuSO$_4$) solutions. However, the use of SC for the control of electrodeposition of other metals (such as Li) from the appropriate electrolytes is also contemplated. diffusion-limited nanowire growth has recently been demonstrated in the same system, but without varying voltage or current, and, as in all prior work, the template surface charge was neither controlled nor thought to play any role.

In exemplary experiments carried out as described herein, an AAO membrane is clamped between two copper disk electrodes under constant pressure, as shown in FIG. 1a. Electrochemical transient signals are measured in CuSO$_4$ solutions of varying salt concentrations, where the dominant Faradaic reactions are copper electrodeposition at the cathode and copper dissolution at the anode. Although the more common method of fabricating the cathodes is to sputter gold or copper onto one side of the AAO membrane, the clamping procedure we use more closely resembles the electrode/separator/electrode sandwich structure in a battery and removes the initial distribution of the sputtered metal as a confounding variable that could affect the current and the morphology of the electrodeposits. We confirmed that there are no cracks on the AAO membrane when the cell is disassembled after electrochemical measurements. In order to prevent the evaporation of the binary electrolyte solution inside the AAO membrane, the electrochemical cell is immersed in a beaker containing the same electrolyte.

Before assembling the cell, charged polyelectrolyte multilayers are deposited on the pore walls of the AAO membrane using the layer-by-layer method, based on electrostatic forces between oppositely charged species. Overcompensation of the outer layer causes a dramatic change in the surface potential. This coating method is very versatile and can tune the surface charge of most substrates, including AAO and polymeric membranes such as Celgard (polypropylene), cellulosic membranes such as cellulose nitrate, and other conventional polymeric battery separators. Positive polyelectrolytes (poly(allylamine hydrochloride), PAH) are directly deposited on the air plasma-treated AAO to confer a positive surface charge, AAO(+). Negatively charged AAO(−) is obtained by depositing negative polyelectrolytes (poly(styrenesulfonate), PSS) on the PAH-coated AAO. Due to the high surface charge density of the layer-by-layer thin films, excess sulfate anions and copper (II) cations are expected to dominate the EDL of the AAO(+) and AAO(−), respectively (FIG. 1b).

Across all the experimental conditions of surface charge and salt concentration, the Debye screening length (<10 nm) is small compared to the pore size, but surprisingly such a thin EDL can still dominate ion transport at high voltage. The charged AAO acts as a "leaky membrane", whose neutral salt can be fully depleted near the cathode, leaving SC to support OLC and deionization shocks in AAO(−) or block transport in AAO(+). This interplay between bulk and surface conduction is very different from polyelectrolyte multilayer-coated nanopores with strong EDL overlap, where current rectification is observed.

Figure 2:
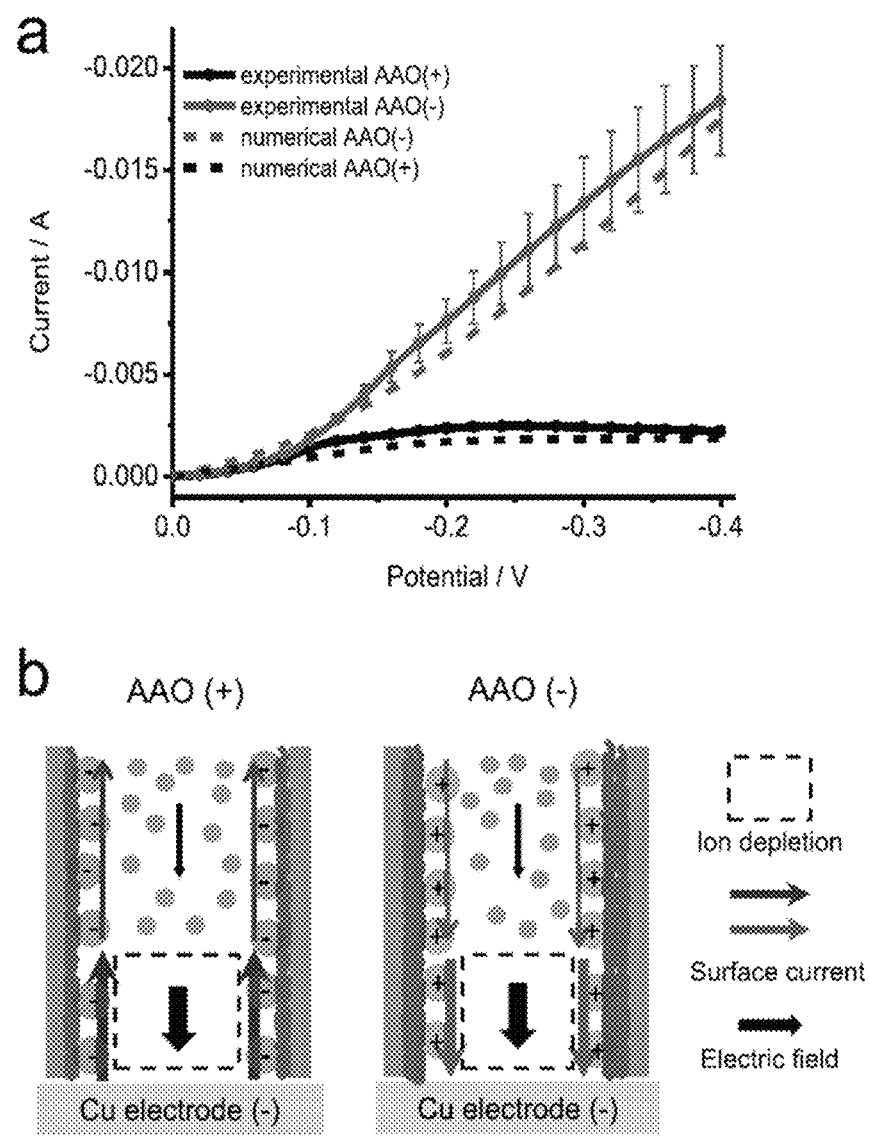
FIG. 2: (a) Experimental (solid line) and numerical current (dash line) versus voltage data for positively (+) and negatively (−) charged AAO membranes in 10 mM $CuSO_4$ at a scan rate of 1 mV/s. (b) Physical picture of surface conduction effects at high voltage, driven by the large electric field in the depleted region. In AAO(+), the $SO_4^{2-}$ counter-ions (blue) migrate toward the anode, reducing the net flux of $Cu^{2+}$ in order to maintain neutrality. In AAO(−), the active $Cu^{2+}$ counter-ions (red) circumvent the depleted region by SC and contribute to OLC.

FIG. 2a shows experimental current-voltage curves (solid lines) of AAO(+,−) in 10 mM CuSO$_4$ for a linear voltage sweep at 1 mV/s, close to steady state. At low voltage below −0.1 V, the two curves overlap, indicating that the surface charge plays no role, consistent with the classical theory. Unlike ion-exchange membranes, a positive curvature is also observed at low voltage, due to the activated kinetics of charge transfer and nucleation. As expected, the onset potential of Cu reduction does not depend on the AAO surface charge.

As the applied potential is increased, dramatic differences in current are observed between AAO(+) and AAO(−). The current in AAO(+) reaches −2.5 mA around −0.2 V and slowly decreases to a limiting current around −2.0 mA, but AAO(−) shows a dramatic linear increase of OLC. The EOI mechanism can be ruled out since it is suppressed in nanopores and insensitive to their surface charge, but EOF could play a role. Since EOF vortices arise regardless of the sign of the surface charge, some OLC can be observed even when the surface charge is reversed, as recently demonstrated for glass frits with micron-scale pores. The lack of any OLC in AAO(+) thus rules out the EOF mechanism.

Instead, the data are consistent with the SC mechanism, as predicted theoretically. The physical picture is sketched in FIG. 2b. For AAO(−), SC provides a short-circuit path for Cu$^{2+}$ counter-ions to circumvent the depleted region and reach the cathode by electro-migration in the large local electric field, as SO$_4^{2-}$ co-ions are pushed toward the anode. The EDL thus acts like a shunt resistor around a diode in reverse bias. For AAO(+), the active Cu$^{2+}$ ions are the co-ions repelled from the EDL, while the SO$_4^{2-}$ counterions migrate away from the cathode and further block Cu$^{2+}$ in the diffusion layer in order to maintain neutrality, thus reducing the limiting current.

In order to predict the OLC due to SC, the system can be modeled as a one-dimensional "leaky membrane" governed by Nernst-Planck equations for dilute, electro-neutral ion transport in a constant background charge. The current-carrying cupric ion has valence z=2 and diffusivity D$_0$=7.14×10$^{-10}$ m$^2$/s. Estimates of the negative and positive surface charge densities, −0.75 e/nm$^2$ and 0.375 e/nm$^2$ respectively, are taken from the literature on PAH/PSS polyelectrolyte multilayers. In some embodiments, Butler-Volmer kinetics are assumed for copper electrodeposition from copper(II) sulfate solutions with parameters averaged from literature values (exchange current density I$_0$=2.95 mA/cm$^2$ at 75 mM and symmetry factor α=0.75). In this embodiment, the electrode surfaces move at the same constant velocity, set by the applied current and copper's density, neglecting the porosity of cathode growth at high voltage (described below).

This simple model is quantitatively consistent with the data, as shown by numerical solutions in FIG. 2a, without adjusting any parameters. This is the first experimental evidence for OLC due to SC, further corroborated below by impedance spectroscopy and electrodeposit imaging. Analytical predictions can also be derived to better understand scaling relationships. Neglecting SC, the diffusion-limited current is $$I_{lim} = \frac{4ze\varepsilon_p D_0 c_0 A}{\tau L} \quad (1)$$

which is twice as large as for a reservoir in place of the anode. For a leaky membrane of length thickness L=60 μm, electrode area A, porosity ε$_p$=0.375 and tortuosity τ=1 (straight parallel pores) filled with an electrolyte of mean concentration c$_0$=10 mM, Equation (1) predicts I$_{lim}$=3.90 mA, which is close to what is observed experimentally. This supports recent scaling evidence for diffusion-limited dynamics in this system, as well as the hypothesis that larger limiting currents observed in random porous media reflect eddy dispersion, which cannot occur in the straight, non-intersecting pores of AAO.

The experiments and simulations both show a constant over-limiting conductance $\sigma_{OLC}$ at high currents defined by $I \sim \sigma_{OLC}*V$, consistent with the SC theory. In this regime, Butler-Volmer kinetics are fast, and the model can be solved analytically. The over-limiting conductance due to SC turns out to be the same as if the anode were replaced by a reservoir, $$\sigma_{OLC} = \frac{zeD_0 A \epsilon_p \sigma_s}{\tau L k_B T h_p} \quad (2)$$

where $\sigma_s$ is the surface charge density and $h_p$ is the effective pore size, equal to half the pore radius for straight parallel pores. Equation (2) predicts an overlimiting conductance of 0.05395 $\Omega^{-1}$, which is close to the experimental and numerical values, 0.05640 $\Omega^{-1}$ and 0.05329 $\Omega^{-1}$ respectively, further supporting the theory of OLC by SC.

Figure 3:
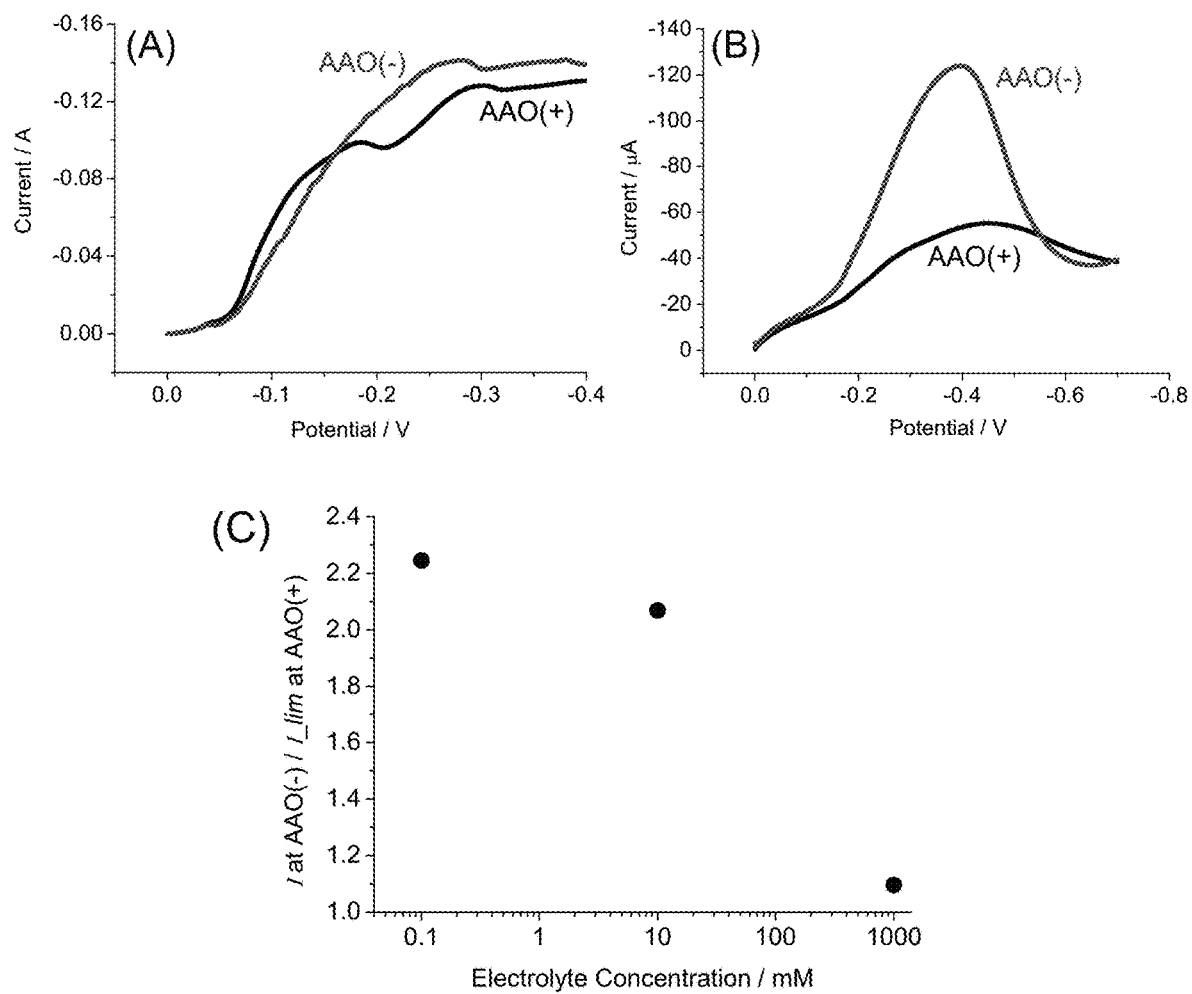
FIG. 3: The effect of electrolyte concentration on SC-driven OLC. I-V curves of AAO(+) and AAO(−) membranes in (A) 1 M $CuSO_4$ and (B) 0.1 mM $CuSO_4$ at a scan rate of 1 mV/s. (C) A plot of current ratio of AAO(−) to AAO(+) as a function of electrolyte concentration.

The over-limiting conductance has a weak dependence on the salt concentration. In 1 M $CuSO_4$, both membranes show almost the same limiting current without any OLC (FIG. 3a), as expected for classical electro-diffusion. This is consistent with the SC mechanism since the over-limiting conductance is proportional to surface charge, which decreases at high salt, and the ratio of surface to bulk conduction scales with the inverse salt concentration. On the other hand, in dilute 0.1 mM $CuSO_4$, AAO(−) shows a higher current than the AAO(+), although the current decreases as the potential is increased due to the extremely low concentration of $Cu^{2+}$ cations (FIG. 3b). Comparing currents at the same voltage, the relative OLC for AAO(−) decreases weakly with salt concentration (FIG. 3c), as expected theoretically for the SC mechanism. In contrast, both theory and experiments show that the over-limiting conductance increases significantly with salt concentration for the EOF mechanism.

Figure 4:
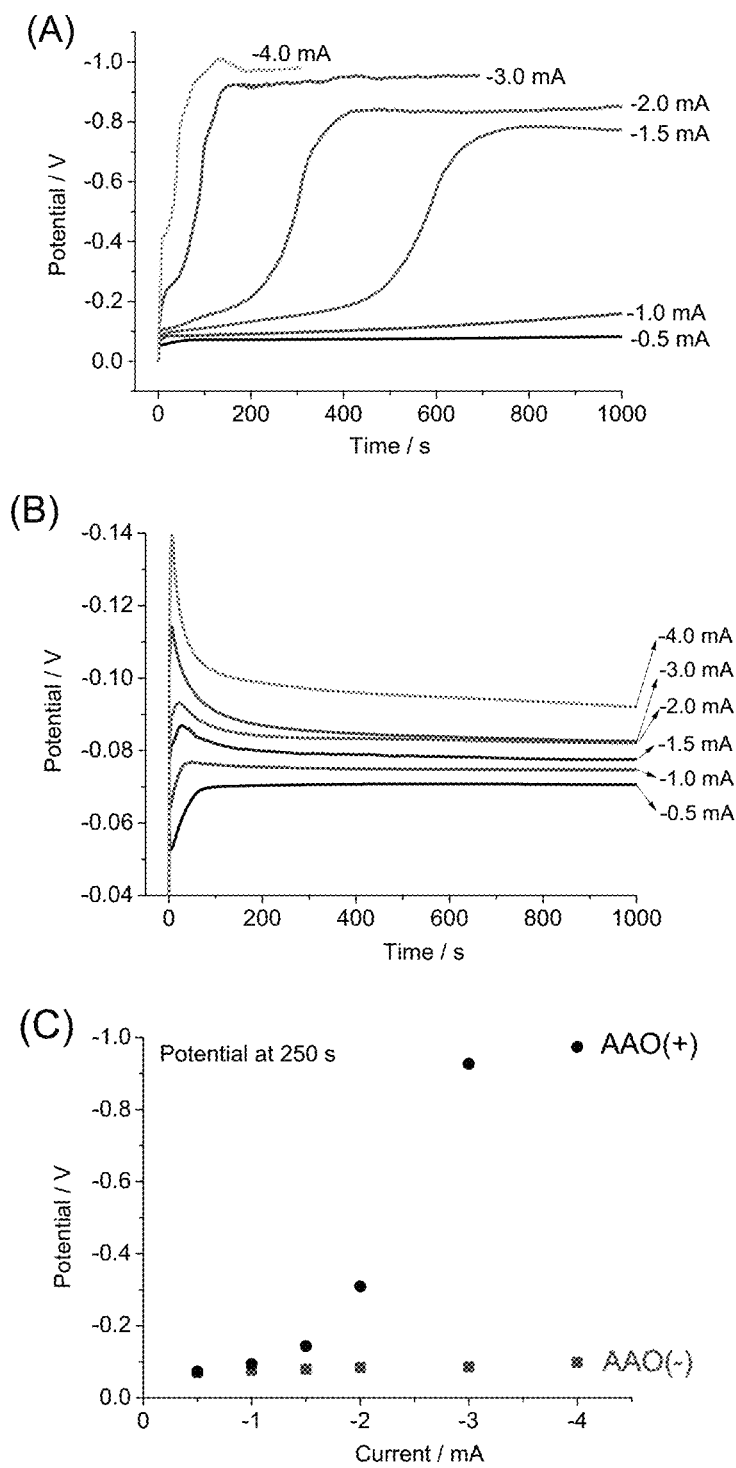
FIG. 4: V-t curves of (A) AAO(+) and (B) AAO(−) in 10 mM $CuSO_4$ with different applied currents. (C) A comparison of potential at 250 s as a function of surface charge and applied currents.

The variation of potential with time at constant applied currents in 10 mM $CuSO_4$ also demonstrates the importance of SC in nanochannels (FIGS. 4a-4c). Below the limiting current (−0.5 mA and −1 mA), the potential variation is almost the same regardless of surface charge (FIG. 4c), again confirming the dominance of bulk electrodiffusion over SC. When the applied current is close to the limiting current (−1.5 mA and −2 mA), AAO(+) shows an abrupt potential increase within ~100 s (FIG. 4a). The higher the applied OLC (−3 mA and −4 mA) is, the shorter the time at which the rapid increase in the potential occurs. This supports the interpretation that OLC in the AAO(+) generates an ion depletion region in front of the cathode, leading to a large overpotential that can cause side reactions, such as water electrolysis, consistent with observed gas bubbles. In contrast, AAO(−) maintains a low potential around −100 mV under −4 mA (FIG. 4b), which shows that SC can sustain the electrodeposition process during OLC.

Figure 5:
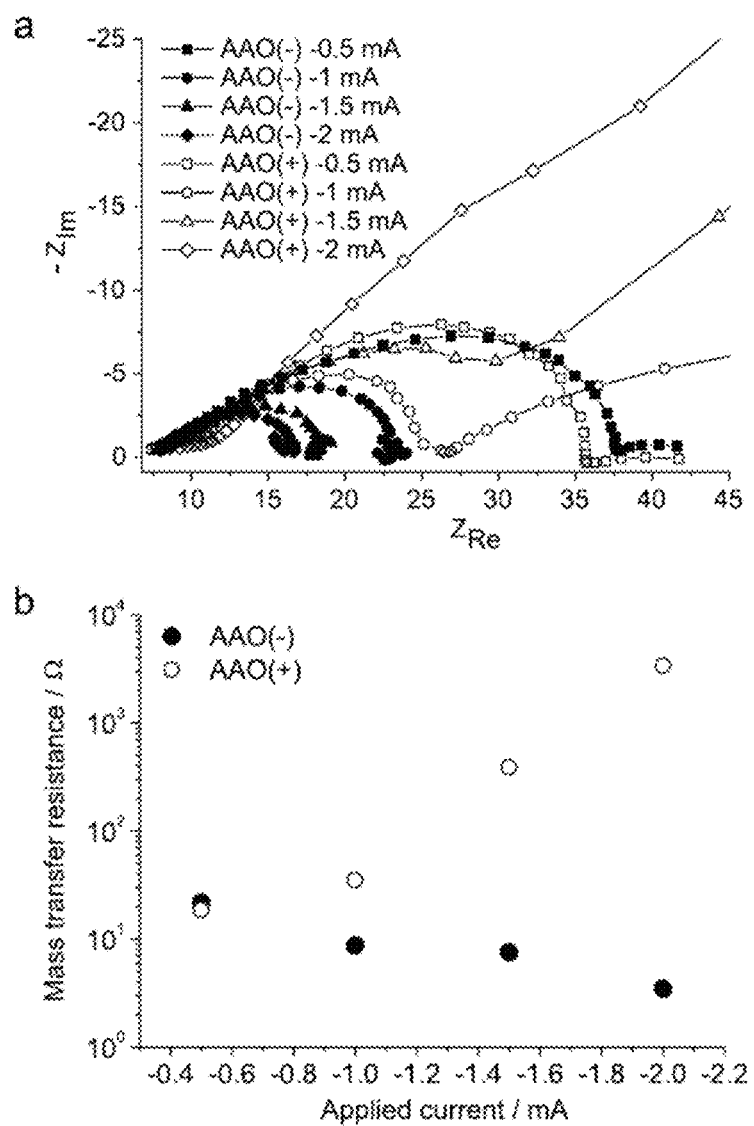
FIG. 5: (a) Nyquist plots of AAO(+) and AAO(−) with different direct currents in 10 mM $CuSO_4$. (b) Fitted mass transfer resistance versus current. The resistance of AAO(+) at −1.0 mA includes both $R_{bd}$ and $R_{sc}$.
Figure 6:
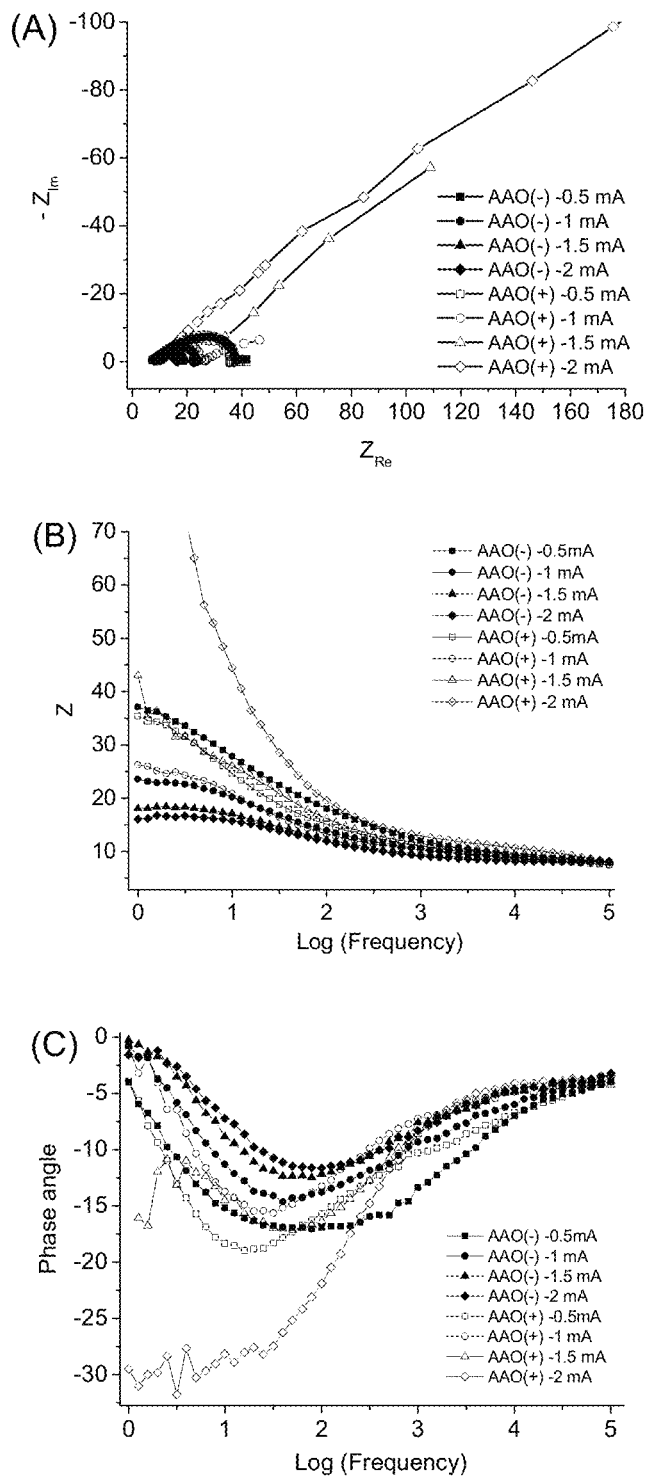
FIG. 6: Full-scale Nyquist plots (A) and Bode plots (B and C) of AAO(+) and AAO(−) with different direct currents in 10 mM $CuSO_4$. (B) Bode plots of total impedance, and (C) Bode plots of phase angle.

The dominant transport processes are also confirmed by impedance spectroscopy (FIG. 5). Different direct currents are applied together with an alternating current of amplitude of 10 μA in the frequency range 100 kHz to 0.1 Hz. FIG. 5a shows the Nyquist plots for varying surface charge and applied current. (The full-scale Nyquist plot and Bode plots are shown in FIG. 6.) When −0.5 mA is applied, the impedance is almost independent of the surface charge, except that the total Warburg-like resistance of AAO(+) is larger than that of AAO(−) by 6%, which is precisely the surface-to-volume ratio of the pore, estimated as the area fraction of the EDL, $\lambda_D/h_p=0.06$, where $\lambda_D=5.0$ nm is the Debye length. This supports the hypothesis that the surface charge dependence results from SC asymmetry for the active $Cu^{2+}$ ions, even below the limiting current. Under −1 mA, the Warburg-like arc for both cases shrinks, consistent with a shortening of the diffusion layer, as the depleted zone expands into the pore.

The impedance at high currents further supports the physical picture as illustrated in FIG. 2b. For the AAO(−), there is no other impedance feature, consistent with a negligible resistance for SC in the depleted region, and the Warburg-like arc shrinks with increasing current. For AAO (+), a new low-frequency feature develops for −1 mA that overwhelms the diffusion arc below −1.5 mA and leads to orders-of-magnitude larger mass-transfer resistance versus AAO(−) (see FIGS. 5a and 6a). This indicates significant ion blocking by SC in AAO(+), also confirmed by imaging the electrodeposit below.

Figure 7:
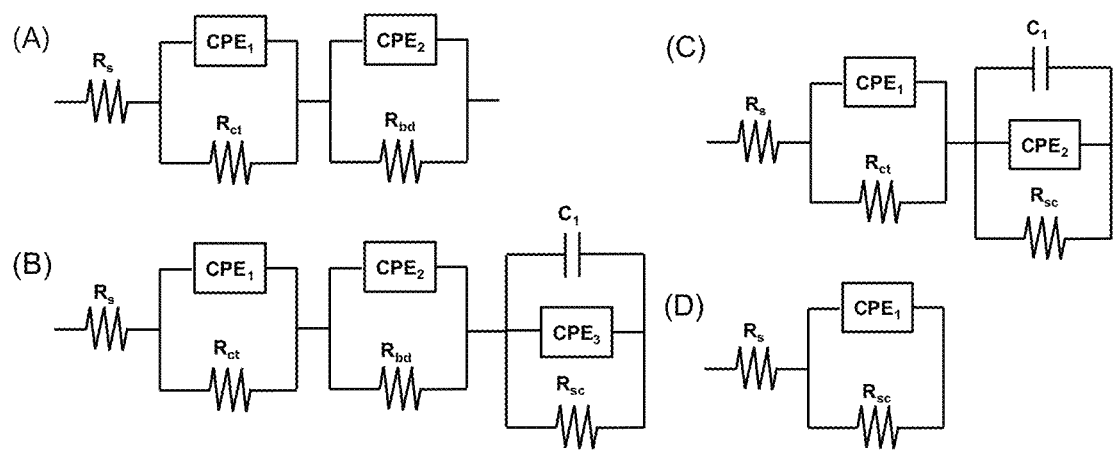
FIG. 7: Four kinds of equivalent circuit models for (A) AAO(−) at all currents and AAO(+) at −0.5 mA, (B) AAO(+) at −1.0 mA, (C) AAO(+) at −1.5 mA and (D) AAO(+) at −2 mA.
Figure 8:
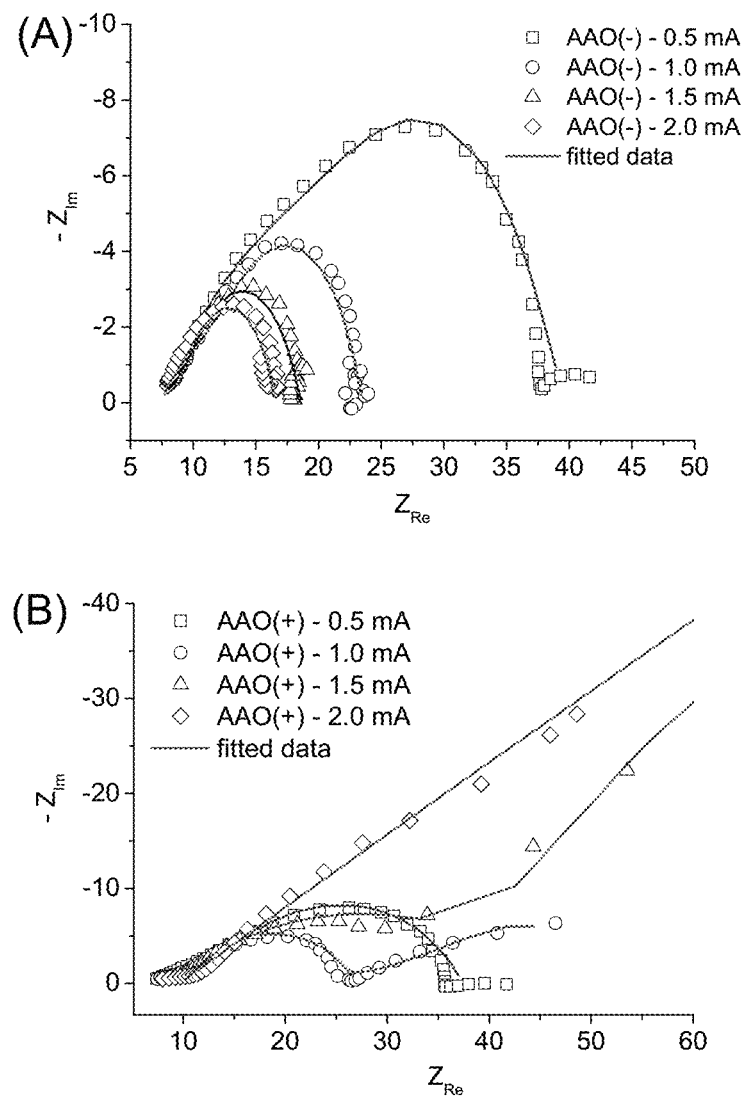
FIG. 8: Nyquist plots of (A) AAO(−) and (B) AAO(+) with fitted data. The dotted and solid lines are experimental data and fitted data, respectively.

Interpretation of the impedance spectra is quantified by fitting to four equivalent circuit models (FIG. 7), depending on the applied current and surface charge of AAO. These models consist of the solution resistance ($R_s$), charge transfer resistance ($R_{ct}$), bulk diffusion resistance ($R_{bd}$), constant phase element (CPE), and additional resistance ($R_{sc}$) and pure capacitance (C) due to SC. The CPE is introduced to take into account the surface roughness of the electrode and/or the inhomogeneous reaction rate. (The fitted Nyquist plots are shown in FIG. 8.) These models are necessarily empirical since there is no theory available for electro-diffusion impedance in a charged nanopore during OLC (unlike the case below limiting current), but they suffice to extract consistent trends, such as the total mass transfer resistance versus the applied current (FIG. 5b). AAO(−) maintains low resistance due to SC-driven OLC that decreases with increasing current, which we attribute to the shrinking diffusion layer as the depletion zone expands. On the other hand, the resistance of AAO(+) diverges as the current is increased, indicating severe ion depletion.

Figure 9:
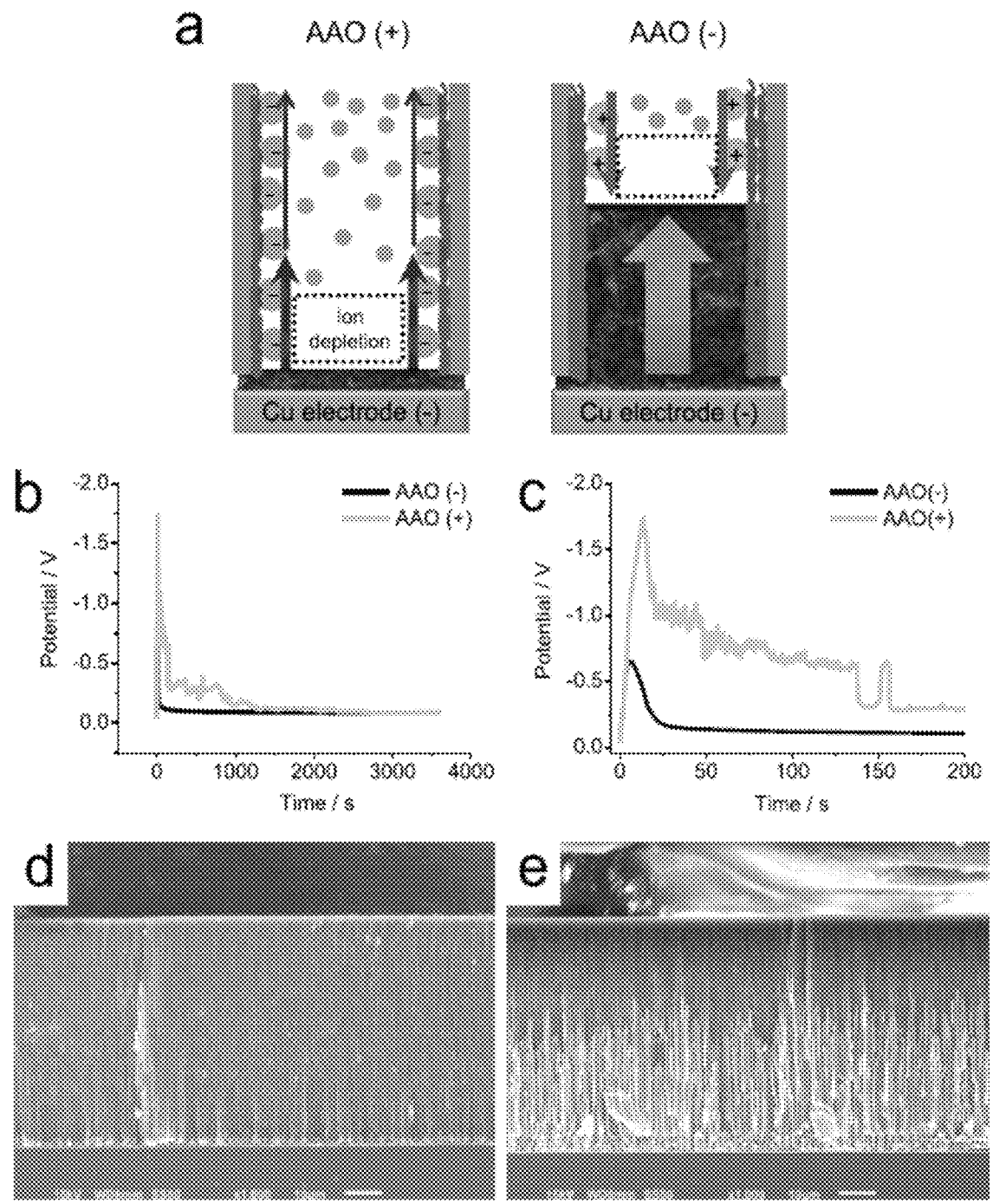
FIG. 9: (a) Effect of SC on electrodeposition in charged nanopores during OLC. (b) V-t curves of AAO(+) and AAO(−) for an applied current of −6 mA. (c) Magnification of data of (b) for first 200 s. (d) SEM images of electrodeposited Cu nanowires in AAO(+) and (e) AAO(−).

The physical picture illustrated in FIG. 2b is further supported by the morphology of copper deposits grown during OLC, which reveals for the first time the dramatic effects of nano-template surface charge (FIG. 9a). In the SC-dominated regime, AAO(+) is expected to block copper penetration into the nanopores, while AAO(−) should promote growth of a nanowire array following a deionization shock that is stable to shape perturbations. For sufficiently high voltage and low salt, SC-guided electrodeposition should conformally coat the surfaces, leading to an array of nanotubes.

In order to test these theoretical predictions, copper electrodeposits are grown under OLC of −6 mA, three times the limiting current (−2 mA). In these experiments, the cathode is copper evaporated on a silicon wafer in order to facilitate subsequent cross-sectional scanning electron microscopy (SEM). As soon as the current is applied, both AAO(+) and AAO(−) show a drastic increase of potential after 20 s (FIGS. 9b-9c), influenced by the kinetics of Cu reduction and nucleation. The potential for AAO(+) is unstable and reaches a much larger value, −1.75 V, leading to gas bubbling, while AAO(−) exhibits a stable, low potential around −0.1 V.

Figure 10:
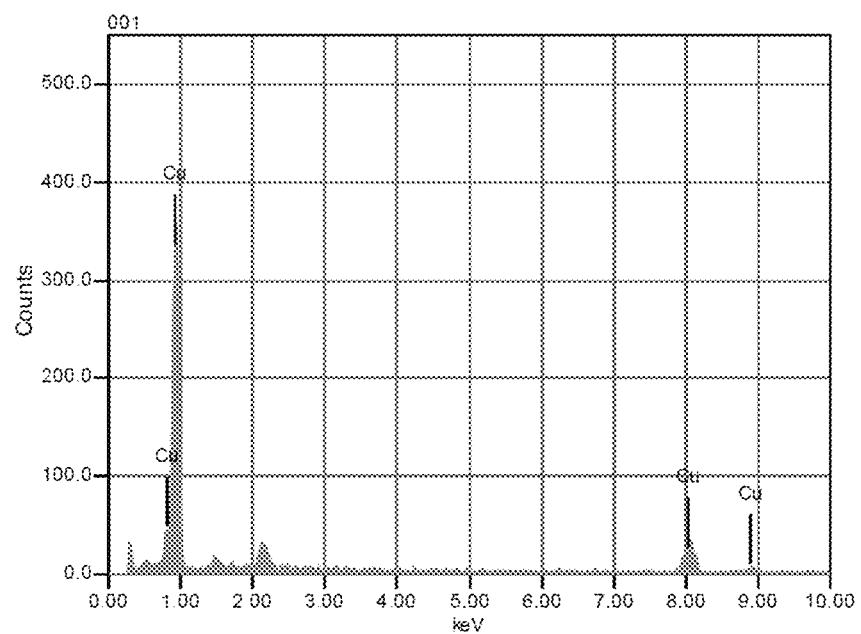
FIG. 10: EDS data of Cu nanowire arrays.
Figure 11:
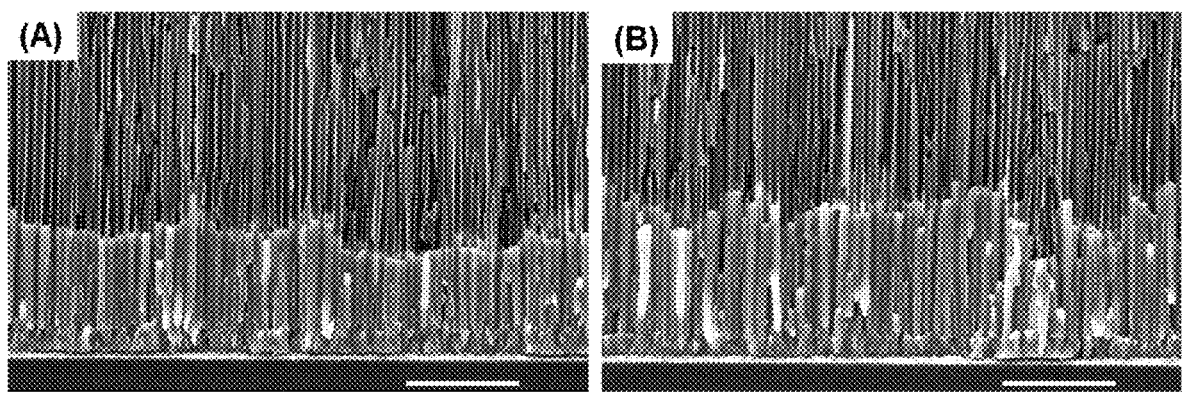
FIG. 11: SEM images of Cu nanowires electrodeposited from (A) AAO(+) and (B) AAO(−) in 1 M $CuSO_4$. The scale bars are 5 μm.

The morphology of the deposits is revealed by SEM images (FIGS. 9d-9e), and their composition is confirmed to be pure copper by energy dispersive x-ray spectroscopy (EDS) (FIG. 10). In AAO(−), an array of nanowires is obtained with an average length of 35 μm, set by the time of the experiment. In stark contrast, the growth in AAO(+) extends less than 3 μm into the nanopores (<10 times their diameter), during the same experimental time. The positive surface charge effectively blocks dendritic growth from entering the porous template, leading to uniform copper electroplating below the template (not shown). Consistent with the theory, this striking effect of surface charge is reduced by increasing salt concentration. In 1 M CuSO$_4$, the copper nanowires in the negative AAO are only slightly longer than that in the positive AAO because the SC is less important compared to bulk electrodiffusion in a concentrated electrolyte (FIG. 11). These results show that electrodeposition in nanopores can be controlled by varying the surface charge, salt concentration, and current to change the relative importance of bulk and surface transport.

Figure 12:
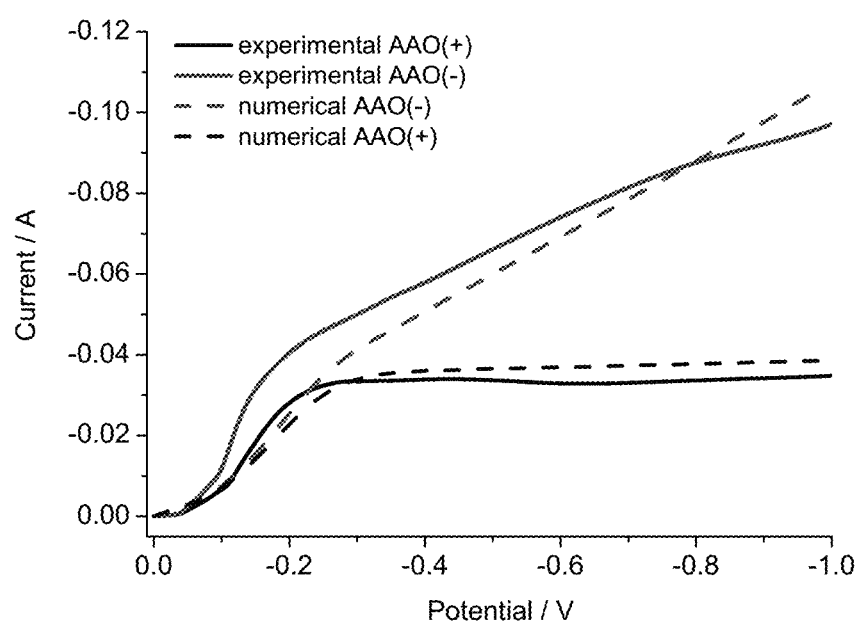
FIG. 12: Current data for AAO(+) and AAO(−) membrane in 100 mM $CuSO_4$/100 mM $H_3BO_3$ at a scan rate of 10 mV/s.

Nanotubes grown over the surface of AAO(−) provide visual evidence of the SC mechanism. Although we find some nanotubes in the original experiments, more consistent nanotubes are obtained at higher voltages (further into the SC dominated regime) by chronoamperometric electrodeposition in a three-electrode cell, where AAO/Cu-evaporated on a Si wafer is used as the working electrode. A graphite pole and Ag/AgCl electrode are used as counter and reference electrodes, respectively, in order to accommodate hydrogen evolution at the anode. H$_3$BO$_3$ is added to reduce the hydrogen evolution rate at a high voltage and does not affect SC-driven OLC (FIG. 12). To attach the AAO template to the Cu-evaporated Si wafer electrode, pre-electrodeposition is carried out in a two-electrode cell (FIG. 1a) in 100 mM CuSO$_4$/100 mM H$_3$BO$_3$ by employing repeating chronopotentiometry, where underlimiting current (−10 mA) and 0 mA are applied for 30 s and 15 s respectively for 20 cycles. SEM images confirm that the height and the morphology of pre-electrodeposits are almost the same regardless of surface charge of AAO membranes. After pre-electrodeposition, the three-electrode cell is arranged and a large voltage, −1.8 V, is applied in the same electrolytic solution.

Figure 13:
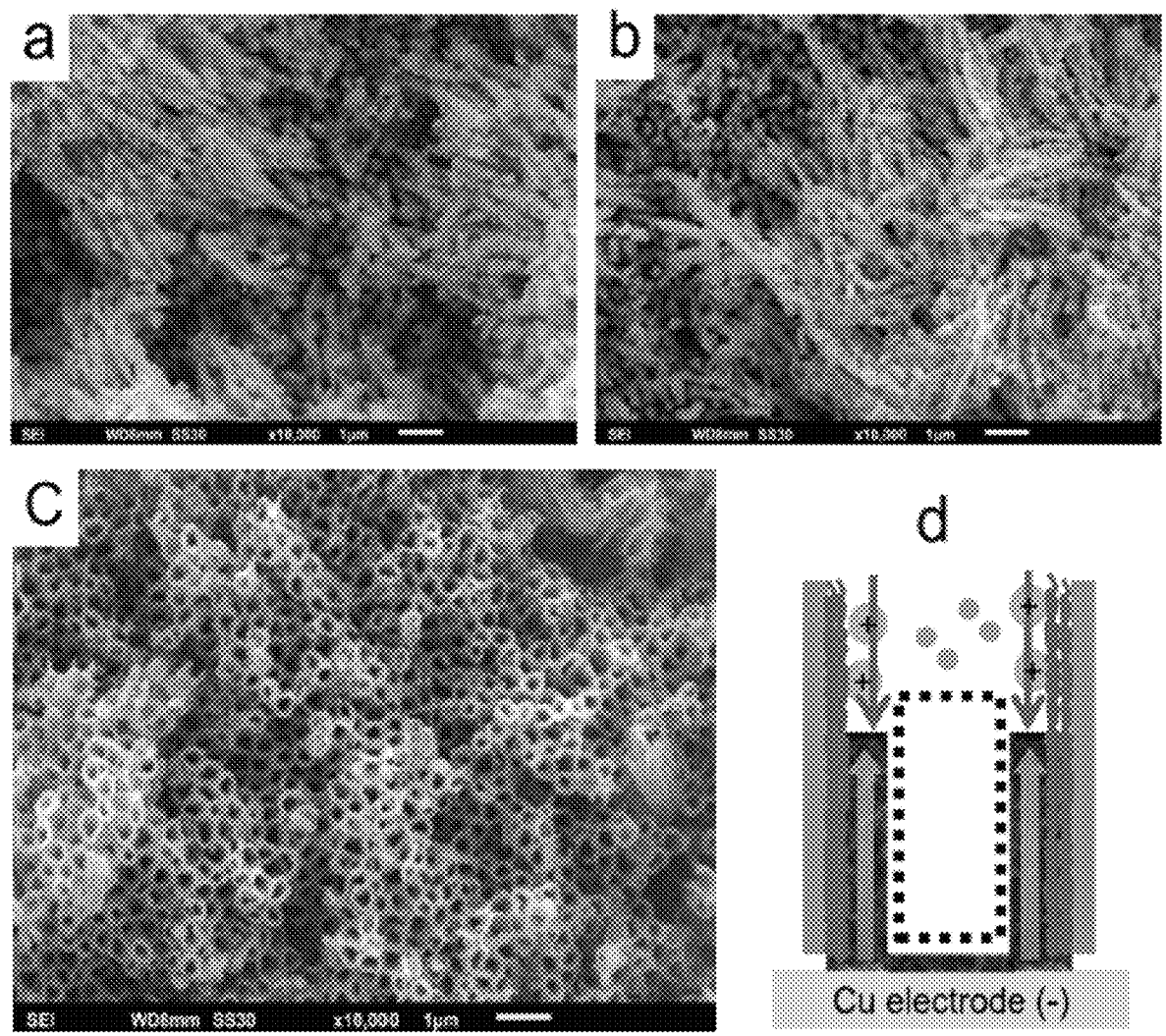
FIG. 13: The effect of SC on the morphology of copper electrodeposits grown in 100 mM $CuSO_4$/100 mM $H_3BO_3$ solution after −1.8 V is applied for 5 min. SEM images of irregular nanowires generated in (a) bare AAO and (b) AAO(+). (c) SEM image of nanotubes grown in AAO(−), driven by SC as in (d).
Figure 14:
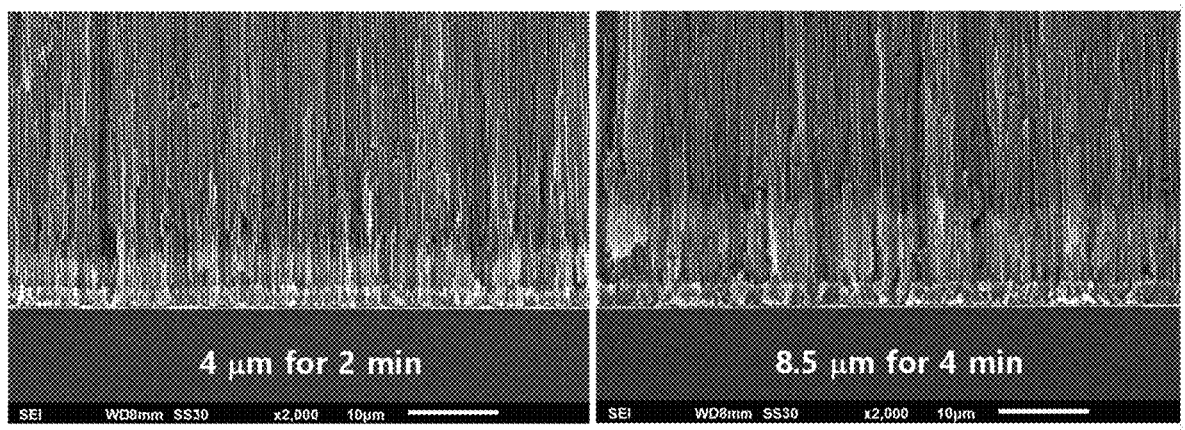
FIG. 14: Cross-sectional SEM images of nanotubes generated in AAO(−) membrane. −1.8 V was applied for 2 and 4 min in 100 mM $CuSO_4$/100 mM $H_3BO_3$ solution at room temperature. The nanotubes are very uniform and growth rate is about 2 μm per min.
Figure 15:
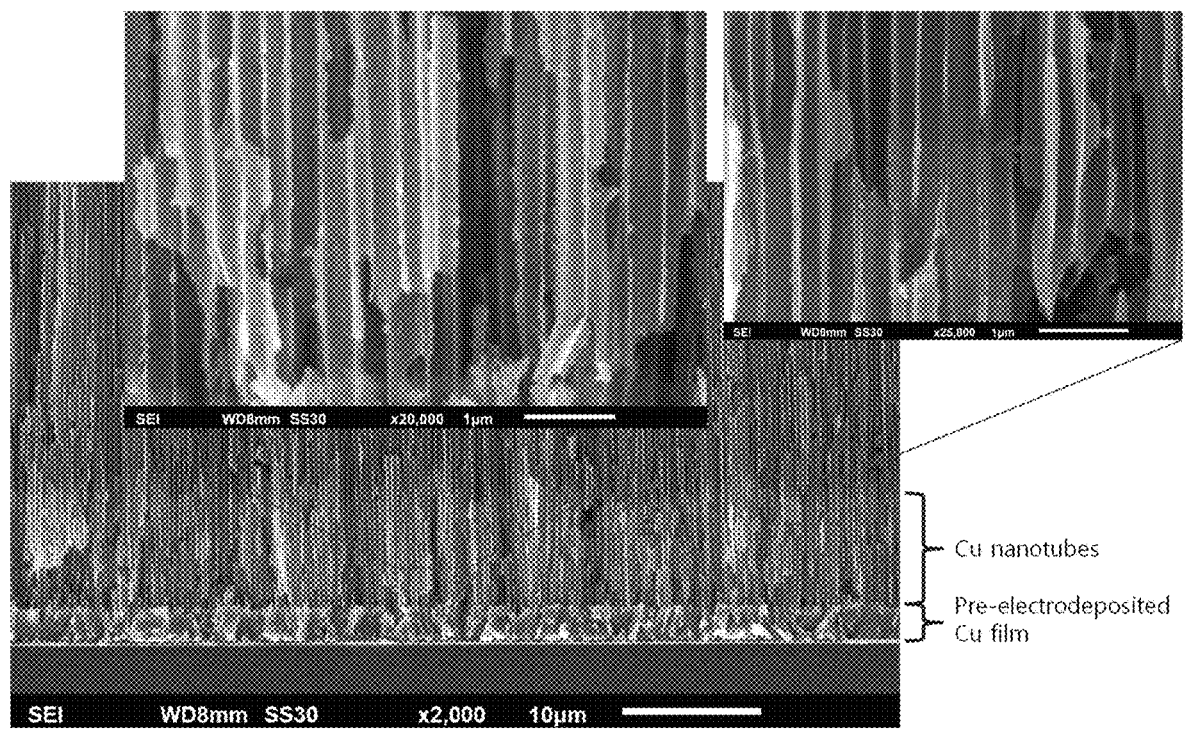
FIG. 15: Cross-sectional SEM images of nanotubes generated in AAO(−) membrane. −1.8 V was applied for 4 min in 100 mM $CuSO_4$/100 mM $H_3BO_3$ solution at room temperature. The red arrow indicates the tip of nanotubes along the walls of AAO membrane.

FIG. 13 shows the dependence of the electrodeposit morphology on the nanopore surface charge, far above the limiting current. The bare AAO and AAO(+) have irregular nanowires (FIGS. 13a-13b). Note that the surface of bare AAO is slightly positive since the isoelectric point (pI) of aluminum oxide is around 8. The irregular dendritic growth, penetrating past the blockage demonstrated in FIG. 9d, may result from electroconvection in the depleted region at this high voltage. On the other hand, AAO(−) at the same voltage shows well-defined copper nanotubes of uniform height (FIGS. 13c and 14), whose wall thickness is less than 20 nm (FIG. 15). This is consistent with SC control (FIG. 13d) rather than previously proposed mechanisms that are independent of the surface charge, such as chemical affinity, vertical current by high current or potential[21], and morphology of sputtered metal.

Figure 16:
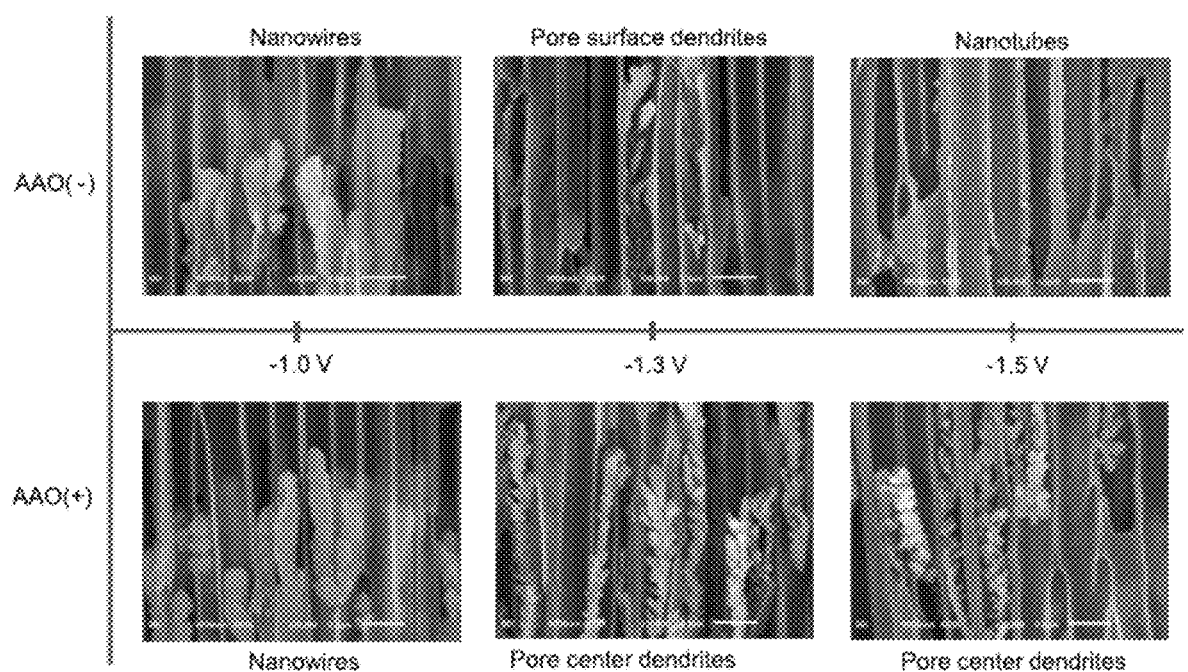
FIG. 16: High-resolution SEM images (with 0.5 μm scale bars) of copper electrodeposits grown in charged AAO membranes, showing the morphology transition versus pore surface charge and the applied voltage. Electrodeposition was carried out in 100 mM $CuSO_4$/100 mM $H_3BO_3$ at each potential for 4 min.

FIG. 16 illustrates the high-voltage morphological transitions. At −1.0 V, rough nanowire growth is observed that penetrates in four minutes less than 2 μm for AAO(+), compared to 3 μm in AAO(−). At −1.3 V, surface dendrites fed by SC growing along the pore walls to 4-5 μm in AAO(−), while longer, thin dendrites grow to 5−6 μm in AAO(+), avoiding the walls due to opposing SC. At −1.5 V, the surface dendrites in AAO(−) become more dense and transition to conformal-coating nanotubes reaching 6-7 μm, while those in AAO(+) are guided along the pore center out to 5-8 μm without touching the walls. By comparing the morphologies in AAO(−) under −1.3V and −1.5V, we can see that the transition from nanowire to nanotube growth is the formation of a surface-conduction-induced metallic layer (precursor nanotube) on the pore walls, upon which electrodeposition may continue to thicken the nanotube if sufficient Cu$^{2+}$ ions are available in the solution (the case of −1.3V), or merely grow along the pore walls to form longer nanotubes (the case of −1.5V). In contrast to random, fractal growth in bulk solutions, these results demonstrate that dendrites can be precisely controlled in nanopores by tuning the surface charge, voltage and geometry.

This experiment demonstrates the importance of surface transport in electrodeposition. By modulating the surface charge of AAO nanopores with polyelectrolytes, it has been shown that surface conduction (SC) is responsible for either enhancement or suppression of over-limiting current (OLC) between copper electrodes, depending on the sign of the surface charge. For positive surface charge (same as the electro-active copper(II) ions), SC blocks dendrite penetration upon ion depletion; at high voltage, dendrites are channeled along the pore centers, avoiding the double layers. For negative surface charge, SC promotes uniform electrodeposition into the AAO template during OLC; at high voltage, growth is guided along the pore walls, consistent with an observed transition from copper nanowires to nanotubes.

These observations have many possible applications in electrochemical systems, microelectronics, and nanotechnology. SC-guided electrodeposition in nanopores can be used in place of solid electrolyte breakdown for programmable-metallization or resistive-switching random access memory, a low-voltage alternative to flash memory where each bit is a metal (e.g., copper) dendrite that reversibly short circuits two nanoelectrodes and acts like a memristor. Surface charge modification can also be used to control the morphology of metal electrodeposition in nanostructured templates for 3D electronics, 3D batteries, and nanostructure synthesis. By selectively coating polyelectrolytes or other charged species on a template by lithography, patterns of suppressed or enhanced electrodeposition with desired morphology can be achieved. By dissolving the template after growth, multifunctional nanoparticles for electrocatalysis, molecular sensing or material additives can be made by combining metals, nanoparticles, polymers, and polyelectrolytes during SC-guided electrodeposition. Although the experiments disclosed herein involve copper electrodeposition at relatively low concentrations, suppressing metal growth with positively charged coatings in porous media also has applications to dendrite-resistant battery separators and reversible metal anodes for rechargeable batteries, in contrast to the negatively charged separators considered in recent work. One of skill in the art will recognize that the examples provided herein demonstrate that inhibition of dendrite growth for e.g., Li electrodes can be provided by dendrite resistant battery separators, thereby providing improved reversible Li anodes for rechargeable batteries having a positive surface charge on the battery separators as described herein.

Thus, in various embodiments, the present disclosure is directed to improved anodes for rechargeable batteries comprising a metal electrode and a porous membrane disposed on the surface of metal, wherein the pore surfaces of the porous membrane have a positive or negative surface charge. When the surface of the pores are positively charged, metal growth (e.g. dendrites) on the surface of the anode is suppressed, thereby rendering the porous membrane dendrite-resistant, and therefore reducing short circuits, or increasing the reliability of the battery.

Alternatively, when the surface of the pores is negatively charged, electrodeposition of metal on the metal surface can be controlled to enhance the desired morphology, for example to control the deposition of metal on an anode during recharging.

Surface charges can be provided on the pore surface by any suitable method. For example if the membrane is a porous inorganic material, the surface charges can be provided by implantation of suitably charged positive or negative ions. Alternatively, the surface charges can be provided by coating the surface of the pores with suitable polyelectrolytes, such as anionic polyelectrolytes or cationic polyelectrolytes. A nonlimiting list of suitable anionic polyelectrolytes include anionic polymers, such as poly(acrylic acid), poly(methacrylic acid), polystyrenesulfonate, including copolymers thereof, and combinations (e.g., blends) thereof. Other acid functional, including carboxylic acid, sulfonic acid, and phosphonic acid substituted polymers can also be used, A nonlimiting list of suitable cationic polyelectrolytes include, for example poly(allylamine) salts such as polydiallyldimethylammonium chloride (pDADMAC) and poly(allylamine hydrochloride) (PAH), polystyrene amine salts, copolymers thereof, and combinations thereof. Other aminofunctional polymers can also be used.

The positively and/or negatively charged polymers disclosed herein can be applied to the surface of the porous media in any suitable fashion. For example, PAH can be directly deposited on the pore surfaces of e.g. air plasma-treated AAO to confer a positive surface charge, AAO(+). Negatively charged AAO(−) is obtained by depositing negative polyelectrolytes (poly(styrenesulfonate), PSS) on the PAH-coated AAO.

The absolute value of the surface charge of the porous membrane ranges from about 0.2 to about 0.8 e/nm$^2$ (i.e., about −0.2 to about −0.8 e/nm$^2$ for negatively charged surfaces, and about 0.2 to about 0.8 e/nm$^2$ for positively charged surfaces). In particular embodiments, the absolute value of the surface charge of the porous membrane is about 0.2, about 0.3, about 0.4, about 0.5, about 0.6, about 0.7, or about 0.8 e/nm$^2$, inclusive of all ranges and subranges therebetween.

In some embodiments, the improved anode described herein, comprising a metal electrode and a porous membrane with a positive or negative surface charge is the anode of a rechargeable battery, for example a Li battery. Any suitable electrolyte can be used in such a battery. A nonlimiting list of suitable electrolytes can be non-aqueous liquid electrolytes that can include polar solvents such as, for example, alcohols or aprotic organic solvents. Numerous organic solvents have been proposed as the components of Li-ion battery electrolytes, notably a family of cyclic carbonate esters such as ethylene carbonate, propylene carbonate, butylene carbonate, and their chlorinated or fluorinated derivatives, and a family of acyclic dialkyl carbonate esters, such as dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate and butylpropyl carbonate. Other solvents proposed as components of Li-ion battery electrolyte solutions include γ-butyrolactone, dimethoxyethane, tetrahydrofuran, 2-methyl tetrahydrofuran, 1,3-dioxolane, 4-methyl-1,3-dioxolane, diethyl ether, sulfolane, methylsulfolane, acetonitrile, propiononitrile, ethyl acetate, methyl propionate, ethyl propionate, dimethyl carbonate, tetraglyme, and the like. These nonaqueous solvents are typically used as multicomponent mixtures, into which a salt is dissolved to provide ionic conductivity. Exemplary salts to provide lithium conductivity include LiClO$_4$, LiPF$_6$, LiBF$_4$, LiTFSI, LiBETI, LiBOB, and the like.

The electrodes of the present invention can comprise any suitable metal, for example Cu, Li, Na, K, Mg, Zn, Au, Ni, Al, Cr, Cd, and Fe, either in the form of a pure metal, or an alloy, such as steels or any other alloy, intercalation compound, etc. In a particular embodiment, the electrode is Li.

The battery separators of the present invention can comprise any suitable battery separator with ion-permeable medium through which ions are transported. In some embodiments, the ion-permeable medium can comprise a membrane. The membrane can be any conventional membrane that is capable of ion transport. In one or more embodiments, the membrane is a porous polymer membrane infused with a liquid electrolyte that allows for the shuttling of ions between the anode and cathode electroactive materials, while preventing the transfer of electrons. In some embodiments, the membrane is a microporous membrane that prevents particles forming the positive and negative electrode flowable compositions from crossing the membrane. Exemplary membrane materials include polyethyleneoxide (PEO) polymer in which a lithium salt is complexed to provide lithium conductivity, or Nafion membranes which are proton conductors. For example, PEO based electrolytes can be used as the membrane, which is pinhole-free and a solid ionic conductor, optionally stabilized with other membranes, such as glass fiber separators as supporting layers. PEO is stable in contact with typical alkyl carbonate-based electrolytes. In some embodiments, commercially available polymer separators such as the microporous membranes from Celgard are suitable separators that can be used in the present invention. In still other embodiments, the separator is a cellulosic membrane, for example a cellulose nitrate, regenerated cellulose, or cellulose acetate membrane.

The electrochemical cells, i.e., batteries of the present invention can include any of the known and commercially available batteries, including lithium ion battery, lithium polymer battery, nickel metal hydride battery, nickel cadmium battery, nickel zinc battery, and the like. The form factors of batteries can include cylindrical cells, prismatic cells, prismatic pouch cells, pouch cells, button cells, and a combination of any of these cells thereof.

Methods Summary

In some embodiments, some of the materials used include any of the following chemicals, including poly(allylamine hydrochloride) (PAH, 15000 $M_w$), poly(styrenesulfonate) (PSS, 70000 $M_w$), copper(II) sulfate (CuSO$_4$), sodium chloride (NaCl), hydrochloric acid (HCl), boric acid (H$_3$BO$_3$), sodium hydroxide (NaOH), ultrapure deionized water, AAO membranes (pore diameter 300-400 nm, thickness 60 μm, length 47 mm, porosity 0.25-0.50).

In some embodiments, the electrode preparation includes the use of two copper (Cu) disk electrodes (diameter 12 mm, thickness 2 mm) as the working and counter electrodes. Electrode polishing comprises grinding by fine sand paper, followed by 3.0 μm alumina slurry, and thorough rinsing with purified water.

In some embodiments, the instruments utilized include any of the electrochemical measurement tools, such as a potentiostat Reference 3000 Gamry Instruments and a pH meter Orion 910003 from Thermo Scientific to adjust the pH of the polyelectrolyte solution. The morphology and composition of electrodeposited Cu nanostructures were confirmed by scanning electron microscopy (SEM) with energy-dispersive X-ray spectroscopy (EDS) detector (6010LA, JEOL) at 15 kV accelerating voltage.

In some embodiments, for layer-by-layer deposition within AAO membrane, the AAO membrane is treated under air plasma for 5 min to generate a negative charge. The negatively charged AAO was immersed in a polycationic solution (1 mg/mL PAH in 20 mM NaCl at pH 4.3) for 30 min to generate a positive surface charge. Next, the membrane was thoroughly rinsed with purified water three times (10 min for each rinse) to remove unattached polyelectrolytes. The PAH-coated AAO was immersed in a polyanionic solution (1 mg/mL PSS in 20 mM NaCl at pH 4.3), followed by the same cleaning step. The polyelectrolyte-coated AAO was stored in $CuSO_4$ solution. The AAO template was dissolved with 1 M NaOH solution for 2 hours to get front images of Cu dendrites.

Dendrite Suppression by Shock Electrodeposition in Charged Porous Media

Pattern formation by electrodeposition contributes the mechanism of copper dendritic growth to diffusion-limited aggregation, including the effects of electromigration on electrodeposition in weakly charged porous media, with the possibility of stabilizing the growth and eliminating dendrites at high rates.

Suppressing dendrites in porous separators is a critical challenge for high-energy-density batteries with Li, Zn, Na, Cd or other metal anodes. Dendrites accelerate capacity fade and cause dangerous short circuits. Dendrites can be blocked by stiff, dense separators, but usually only at the cost of large internal resistance. Another strategy is to manipulate ionic fluxes near the anode via competing side reactions that interfere with electrodeposition at protrusions or enhance surface diffusion. More stable metal cycling has also been demonstrated by altering the separator chemistry, e.g. with lithium-halide salts, nanoparticles with tethered ionic-liquid anions, hydrophilic separators and electrolytes with large anions, and certain solid polymer electrolytes.

Motivated by reducing space charge, several studies have shown that supplying extra anions by charged nanoparticle dispersion or solvent-in-salt electrolyte can improve battery cycling, although dendrites were not visualized. According to theory and experiments on dendritic growth and electrodialysis, it is unlikely that extended space charge ever forms in free solutions. In the case of copper electrodeposition, morphological instability occurs immediately upon salt depletion at the cathode, which enhances ionic flux to the tips, avoid space charge, and preserves thin double layers. Likewise, hydrodynamic instability can lead to vortices that sustain over-limiting current (OLC), faster than electro-diffusion. This phenomenon is well established in electrodialysis and nanofluidics and may also explain electroconvection observed around dendrite tips.

Figure 17:
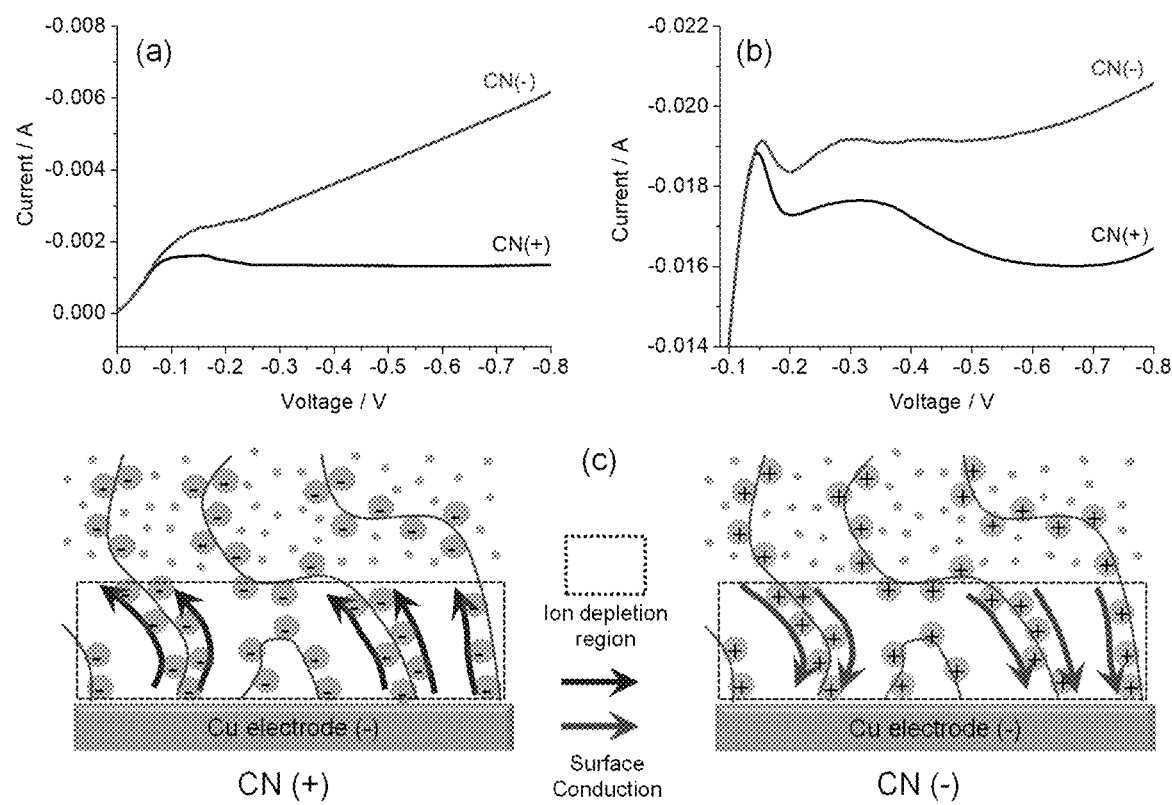
FIG. 17: Voltammetry of CN(+) and CN(−) membranes of exposed area 1.327 $cm^2$ between Cu electrodes in (a) 10 mM $CuSO_4$ at 1 mV/s and (b) 100 mM $CuSO_4$ at 10 mV/s. (c) Physical pictures of the effect of surface conduction on electrodeposition in a charged random porous media, driven by large electric fields in the ion depletion region.

In some embodiments, the principles of morphology control for electrodeposition in porous media is established by exploiting the physics of deionization shock waves. It has been shown that porous separators with thin electric double layers ("leaky membranes") can either stabilize or destabilize metal electrodeposition at high rates, depending on the sign of their surface charge. The initial model system is a symmetric copper cell consisting of a porous cellulose nitrate separator (CN) with positive or negative polyelectrolyte coatings, which is compressed between two flat copper electrodes in copper sulfate solutions. The current-voltage relations in both cases (FIGS. 17a and 17b) show common plateaus around the diffusion-limited current because surface conduction is negligible compared to bulk electro-diffusion. At higher voltages, however, strong salt depletion occurs at the cathode, and dramatic effects of the surface charge are observed (FIG. 17c). The positive separator exhibits reduced cation flux, opposed by surface conduction, while the negative separator exhibits over-limiting current sustained by surface conduction, which also leads to a transient deionization shock ahead of the growth.

Figure 18:
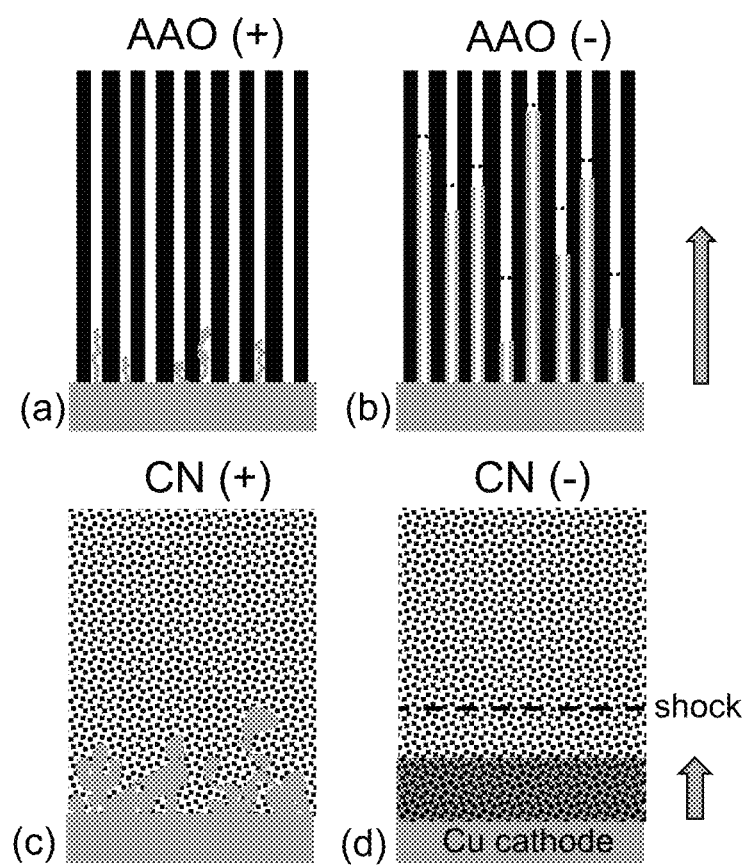
FIG. 18: Morphology selection principles for fast electrodeposition (exceeding diffusion limitation) in charged, porous media with ordered pores (e.g. anodic aluminum oxide, AAO) versus random pores (e.g. cellulose nitrate, CN). In parallel nanopores, (a) positive surface charge suppresses metal penetration or allows thin dendrites avoiding the pore walls, while (b) negative charge promotes non-uniform surface coverage leading to metal nanotubes of different lengths growing behind deionization shock waves (dashed lines). In well-connected, random nanopores, (c) positive surface charge blocks penetration or allows low-density porous dendrites, while (d) negative charge leads to a flat metal-matrix composite film, stabilized by a macroscopic shock wave propagating ahead of the growth.

In some embodiments, the interaction between these nonlinear transport phenomena and the growing deposit is strongly dependent on the porous microstructure, as illustrated in FIGS. 18a-18c. The surface conduction can profoundly influence the pore-scale morphology of copper growth in ordered anodic alumina oxide (AAO) membranes. In such materials with non-intersecting parallel nanopores, diffusion-limited metal growth is inherently non-uniform and leads to a "race of nanowires". Above the limiting current, there is a transition new non-uniform growth modes, either nanotubes following separate deionization shock waves in each pore of the negative membrane (FIG. 18b) or slowly penetrating, pore-center dendrites in the positive membrane (FIG. 18a). In some embodiments, it has been demonstrated that nearly opposite effects of surface conduction on the electrode-scale morphology in random CN membranes with well-connected pore networks. Above the limiting current, some low-density dendritic structures penetrate into the positive membrane (FIG. 18c), but, remarkably, the growth is uniform, dense and reversible in the negative membrane, which we attribute to the propagation of a single flat, stable deionization shock ahead of the deposit (FIG. 18d).

Theory.—In porous media, the physical mechanisms for OLC are very different from those in free solutions and just beginning to be explored. According theory, supported by recent microfluidic experiments, if the counterions (opposite to the pore surface charge) are the ones being removed, then extended space charge is suppressed, and electro-osmotic instability is replaced by two new mechanisms for OLC: surface conduction by electromigration, which dominates in submicron pores, and surface convection by electro-osmotic flow, which dominates in micron-scale pores. Regardless of whether OLC is sustained by constant current or constant voltage, the ion concentration profile develops an approximate discontinuity that propagates into the porous medium, leaving highly deionized fluid in its wake, until it relaxes to a steady linear profile in a finite porous slab. This "deionization shock wave" is analogous to concentration shocks in chromatography, pressure shock waves in gases, stop-and-go traffic, glaciers, and other nonlinear kinematic waves.

The influence of surface conduction on electrodeposition was recently discovered in the investigations of copper electrodeposition in AAO membranes with modified surface charge. Below the limiting current, surface conduction is negligible if the double layers are thin (small Dukhin number), but surface conduction profoundly affects the growth at high currents. With positive surface charge, growth is blocked at the limiting current by oppositely-directed surface conduction and convection; above a critical voltage, some dendrites are observed avoiding the pore walls, likely fed by vortices of reverse electro-osmotic flow returning along the pore centers. With negative surface charge, the growth is enhanced by surface conduction until the same critical voltage, when surface dendrites and ultimately smooth surface films grow rapidly along the walls. These phenomena are consistent with the theory of OLC in a single microchannel, but it is to be expected of different behavior in random media with interconnected pores.

Figure 19:
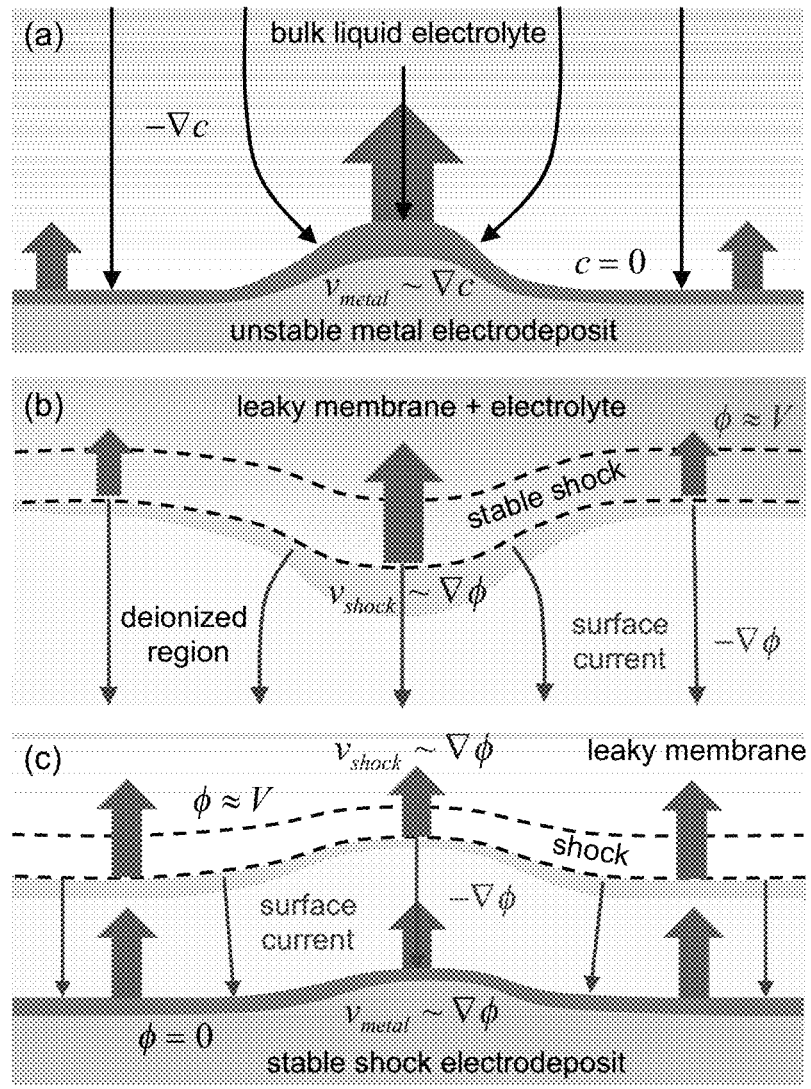
FIG. 19: Basic physics of shock electrodeposition. (a) Dendritic instability of electrodeposition in free solution. (b) Stability of deionization shock propagation in a leaky membrane. (c) Stabilization of electrodeposition behind a deionization shock.

The motivation for experiments is the theoretical prediction that a flat deionization shock is nonlinearly stable to shape perturbations, since the hypothesis is that this stability could be imparted to an electrodeposit growing behind a propagating shock. In free solution, dendritic growth occurs soon after salt depletion, owing to the simple fact that a surface protrusion receives more flux, thereby causing it to protrude further (FIG. 19a). This is the fundamental instability mechanism of Laplacian growth, which leads to continuous viscous fingering or fractal diffusion-limited aggregation (DLA). In contrast, deionization shock propagation is controlled "from behind" by the high resistance of the ion depletion zone. As shown in FIG. 19b, a lagging region of the shock will have more flux leaving by surface conduction, causing it to advance back to the stable flat shape. The dynamics of a thin shock is equivalent to Laplacian dissolution, the stable time reversal of Laplacian growth.

What would happen if a stable deionization shock precedes an unstable growing electrodeposit in a charged porous medium? Using the classical "leaky membrane" model (LMM), the answer depends on the importance of transient diffusion ahead of the shock. The ion concentrations $c_i(\vec{x},t)$ and electrostatic potential $\varphi(\vec{x},t)$ satisfy the Nernst-Planck equations, $$\frac{\partial c_i}{\partial t} + \vec{u}\cdot\nabla c_i = -\nabla\cdot\vec{F}_i = \nabla\cdot(D_i\nabla c_i + z_i e M_i c_i \nabla\phi) \quad (1)$$

and macroscopic electroneutrality, $$\Sigma_i z_i e c_i + \rho_s = 0 \quad (2)$$

including the surface charge density per volume, $\rho_s$. The mean flow is incompressible, driven by gradients in dynamical pressure, electrostatic potential, and chemical potential, respectively, $$\nabla\cdot\vec{u}=0, \quad \vec{u}=-k_D\nabla p - k_{EO}\nabla\varphi - k_{DO}\nabla\ln c_i. \quad (3)$$

The macroscopic ionic diffusivities, $D_i$, and mobilities, $M_i$, Darcy permeability, $k_D$, electro-osmotic mobility, $k_{EO}$, and diffusio-osmotic mobility, $k_{DO}$, depend on $c_i$ and $\varphi$, but not on their gradients or (explicitly) on position. This approximation is reasonable for surface conduction in nanopores, but neglects hydrodynamic dispersion, $D_i(\vec{u})$, due to electro-osmotic flow in micron-sized pores or pore network loops, for which no simple model is available. For transport limitation, the electrode has Dirchlet ($c_i = \varphi = 0$) and Neumann ($\hat{n}\cdot\vec{u}=0$) boundary conditions.

With these general assumptions, the steady-state LMM, Eqs. (1)-(3), is conformally invariant. The profound implication is that quasi-steady transport-limited growth in a leaky membrane (with growth velocity opposite to the active-ion flux, $\vec{v}\sim-\vec{F}_1$) is in the same universality class as Laplacian growth and thus always unstable. This explains the recent theoretical prediction that negative charge in a leaky membrane cannot stabilize quasi-steady electrodeposition, although it can reduce the growth rate of the instability, consistent with the improved cycle life of lithium batteries with tethered anions in the separator.

In contrast, copper electrodeposition experiments in free solution have shown that the salt concentration profile is unsteady prior to interfacial instability and forms a "diffusive wave" ahead of growing dendrites with the same asymptotic profile as a deionization shock. In a negatively charged medium, before the salt concentration vanishes at Sand's time, the diffusion layer sharpens and propagates away from the electrode as deionization shock, which could perhaps lead to stable, uniform "shock electrodeposition" in its wake, as sketched in FIG. 19c. Since the LMM neglects many important processes, however, such as surface diffusion, surface convection, pore-scale heterogenity, and electro-hydrodynamic dispersion, experiments are conducted to answer this question.

Experiments.—In order to isolate effects of charged porous media, we use the same copper system (Cu|CuSO$_4$|Cu) studied by physicists as a canonical example of diffusion-limited growth. Compared to lithium electroplating, which involves complex side reactions and SEI formation, this system is simple enough to allow quantitative interpretation of voltammetry in nanopores and microchannels. A unique feature of the experiments is that the surface conductivity is controlled by modifying the separator surface charge by layer-by-layer (LBL) deposition of charged polymers. To demonstrate the role of pore connectivity for the first time, random porous media, such as cellulose nitrate (CN), with similar pore size (200~300 nm) is chosen as the parallel nanopores of AAO. The charge-modified positive and negative membranes as CN(+) and CN(−), where excess sulfate ions ($SO_4^{2-}$) and cupric ions ($Cu^{2+}$), respectively, are the dominant counter-ions involved in surface conduction (FIG. 17c).

As noted above, voltammetry clearly shows the nonlinear effect of surface conduction. FIG. 17a shows current-voltage curves of CN(+) and CN(−) in 10 mM CuSO$_4$ at a scan rate of 1 mV/s, close to steady state. In the low-voltage regime of slow reactions (below −0.07V), the two curves overlap since the double layers are thin, and surface conduction can be neglected compared to bulk diffusion (small Dukhin number). At the diffusion-limited current, huge differences in CN(+) and CN(−) are suddenly observed. While the current in the CN(+) reaches −1.5 mA around −0.1 V and maintains a limiting current of −1.3 mA, the CN(−) shows a strong linear increase in current, i.e. constant over-limiting conductance. The data are consistent with the SC mechanism (FIG. 17c), which is sensitive to the sign of surface charge. With negative charge, $Cu^{2+}$ counter-ions provide surface conduction to "short circuit" the depletion region to maintain electrodeposition. With positive charge, the $SO_4^{2-}$ counter-ions migrate away from the cathode, further blocking $Cu^{2+}$ ions outside the depletion region in order to maintain neutrality. At higher salt concentration, 100 mM CuSO$_4$, sweeping at 10 mV/s, the results are similar (FIG. 17b) with no effect of SC below −0.15V, limiting current of −19 mA for CN(+), and overlimiting conductance for CN(−), although the effect of SC is weaker (smaller Dukhin number), and transient current overshoot and oscillations are observed.

Striking effects of surface charge are also revealed by chronopotentiometry. When constant OLC is applied, CN(+) exhibits large, random voltage fluctuations due to the blocking of cation transport by the reverse SC of $SO_4^{2-}$ counter-ions near the cathode. Large electric fields drive unstable electro-osmotic flows, some dendritic growth, and water electrolysis, consistent with observed gas bubbles. Metal growth is mostly prevented from entering the CN(+) membrane, so it is easily separated from the cathode after the experiment. In contrast, the voltage drops to a small constant value for OLC in CN(−), and SEM images reveal uniform metal growth by shock electrodeposition.

Figure 20:
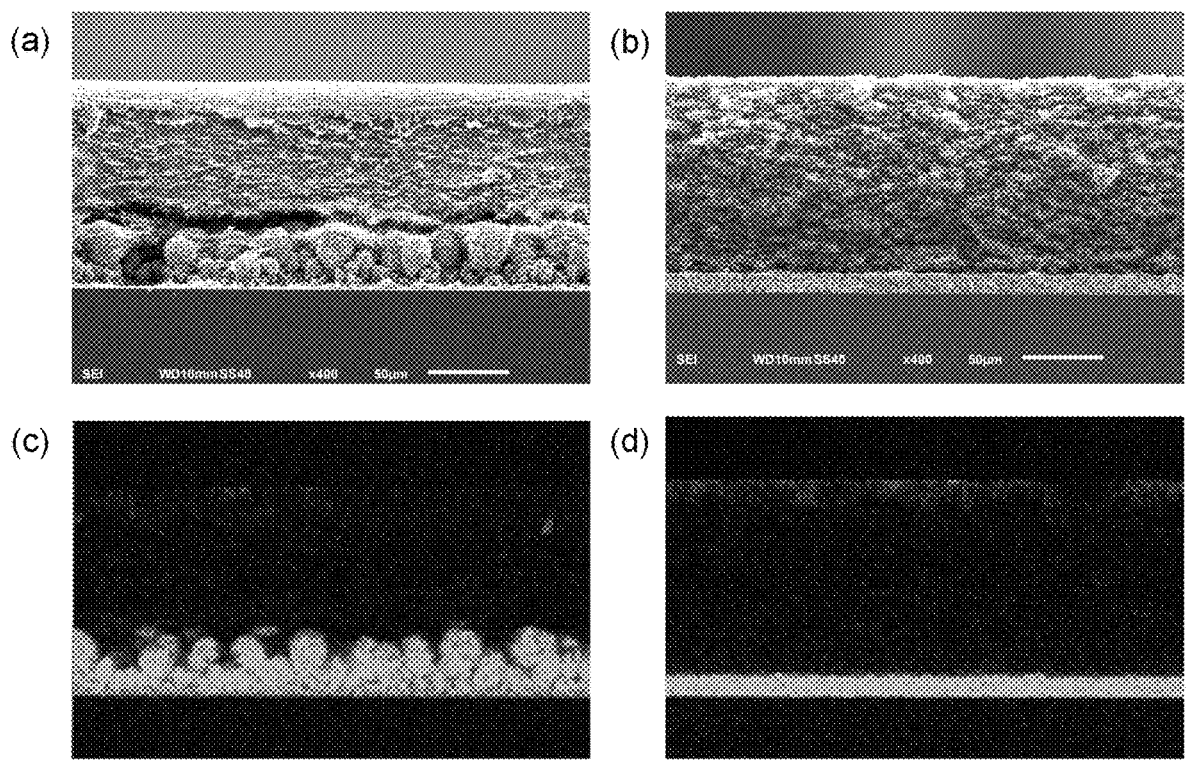
FIG. 20: Morphologies of Cu film depending on surface charge of CN membrane: CN(+) (a and c) and CN(−) (b and d). Cu electrodeposition is carried out in 100 mM $CuSO_4$ by applying −20 mA for 2000 s. SEM images (a and b) and EDS mapping analysis of Cu element (c and d).

FIG. 20 clearly shows the suppression of dendritic instability. When OLC (−20 mA) is applied in 100 mM CuSO$_4$ for 2000 s, irregular electrodeposits are generated in CN(+) (FIG. 20a). This imposed current exceeds the limiting current (−17 mA) measured by voltammetry (FIG. 17b), so the observed low-density stochastic growth, which is opposed by surface conduction, may result from vortices of surface electroconvection, driven in the reverse direction by huge electric field in the depletion region. Once again, under the same experimental conditions, a highly uniform Cu film in CN(−) (FIG. 20b) is obtained by shock electrodeposition.

The difference in morphology of Cu electrodeposits between CN(+) and CN(−) can also be precisely confirmed by EDS mapping analysis of Cu element (FIGS. 20c and 20d). The Cu film in CN(−) shows more compact and flat morphology, consistent with simple estimates of the metal density. Based on the applied current (20 mA), nominal electrode area (1.0 cm×1.5 cm) and time (2000 s), pure copper would reach a thickness of 19.6 μm, which would be increased by porosity, but also lowered by fringe currents, side reactions, and metal growth underneath the membrane. The penetration of copper dendrites in CN(+) to a mean distance of 45 μm, supports the direct observation of low density ramified deposits, while the smaller penetration, 12.8 μm, into CN(−) suggests that shock electrodeposition densely fills the pores.

Figure 21:
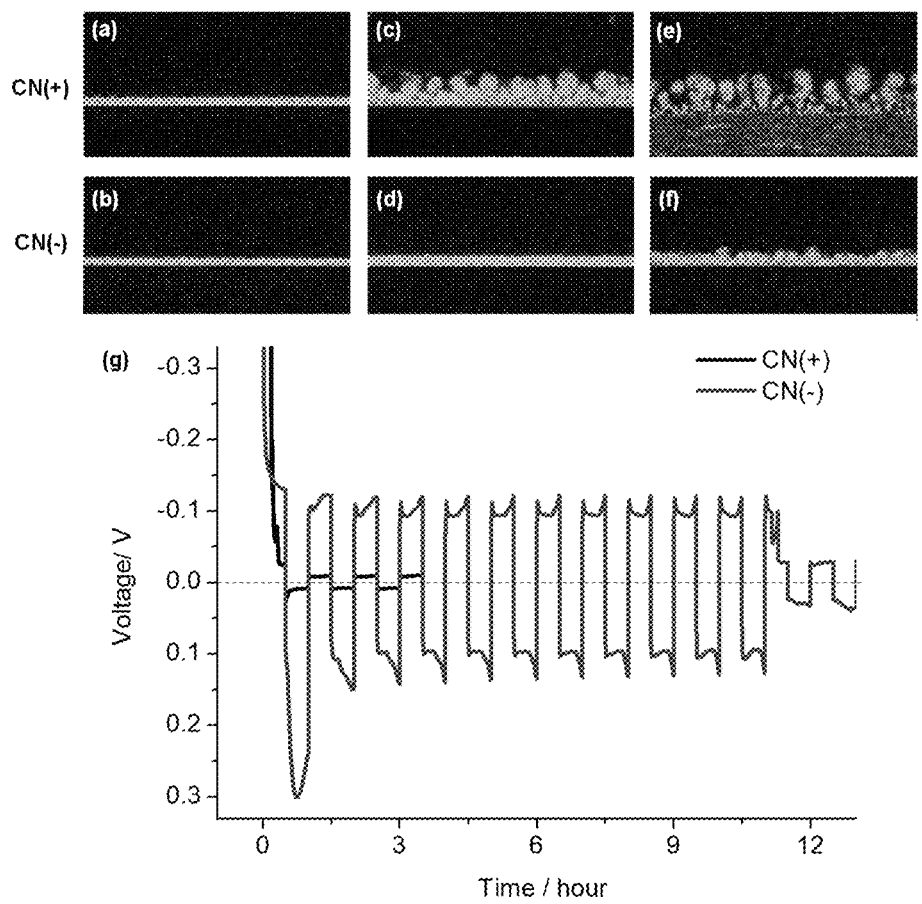
FIG. 21: EDS mapping analysis of Cu element. Cu is electrodeposited in CN(+) (a, c, e) and CN(−) (b, d, f) membranes at constant current densities in 100 mM $CuSO_4$ for 2000 s (a, b) −15 mA, (c, d) −20 mA, and (e, f) −25 mA. (g) Galvanostatic cycling profiles of CN(+) and CN(−) using a symmetric copper cell: Cu is electrodeposited and electrodissolved under extreme OLC (25 mA) for 1800 s in 100 mM $CuSO_4$.

The variation of morphology with applied current is demonstrated in FIGS. 21a-21g. For under-limiting current (−15 mA), both cases exhibit a uniform Cu film (FIGS. 21a and 21b), independent of surface charge, as expected when surface conduction is weak compared to bulk electro-diffusion within the pores (small Dukhin number). As the applied current is increased, highly irregular, dendritic electrodeposits are generated in CN(+), as shown in FIGS. 21c and 21d, when the OLC applied is −20 mA. When extreme OLC (−25 mA) is applied, CN(+) shows much less dense dendritic growth, and weak adhesion of the membrane to the cathode leading to its peeling off (FIG. 21e). On the other hand, shock electrodeposition in CN(−) suppresses dendritic growth and produces uniform, dense Cu films, which show signs of instability only at very high currents (FIG. 21f).

The observed morphologies shed light on the different cycling behavior for positive and negative membranes under extreme currents (±25 mA), as shown in FIG. 21g. The unstable dendritic growth of CN(+) results in short-circuit paths that cause the voltage to drop quickly to 5 mV in the first cycle. Although further cycles are possible, the voltage never recovers. In contrast, the more uniform growth observed in CN(−) is associated with stable cycling around ±100 mV, in spite of the large nominal current density (±18.8 mA/cm$^2$), well above the limiting current. After eleven cycles the voltage drops to 30 mV, but further cycling is still possible without short circuits. Improved cycling life has also recently been reported for lithium metal anodes with separators having tethered anions, albeit at much lower currents (0.5 mA/cm$^2$) without observing the deposits. The observation of stable shock electrodeposition may thus have broad applicability, including rechargeable metal batteries.

In order to investigate the generality of this phenomenon and its potential application to batteries, the same experimental procedures are repeated for several commercially available, polymeric battery separators. The reported results are for a 20 μm thick Celgard K2045 polyethylene (PE) membrane with a pore size of 50 nm, porosity of 47%, and a tortuosity of 1.5, which was modified using the same layer-by-layer (LBL) assembly sequence for either positively or negatively charged membrane. As is evident in the voltammetry of (+) and (−) PE membranes (FIG. 22a), similar overlimiting current behavior, consistent with the nonlinear effect of surface conduction, is observed as the copper electrode is polarized at a scan rate of 2 mV/s in 100 mM CuSO$_4$ solution. Once diffusion limitation begins to dominate at approximately −0.15V, consistent discrepancies in the current-voltage curve can again be attributed to surface conduction, which enhances Cu$^{2+}$ transport in the PE (−) membrane, as anions (SO$_4^{2-}$) in the double layer of the PE (+) membrane further block the transport of Cu$^{2+}$ inside the depleted region near the cathode. The sudden increase in current beyond a voltage of −0.6V for both cases corresponds to short-circuit conditions, where some copper dendrites have spanned from cathode to anode, thereby allowing electrons to pass freely. Although the current-voltage response for both PE membranes is similar to that of the CN membranes, minor discrepancies may be observed at a voltage below −0.15V, where differences in the current output are significant. This is possibly a result of differences in solvent uptake, affected by the extent of membrane wetting by the aqueous solvent, despite the fact that the membranes were soaked in electrolyte overnight before cells were assembled for analysis.

Figure 22:
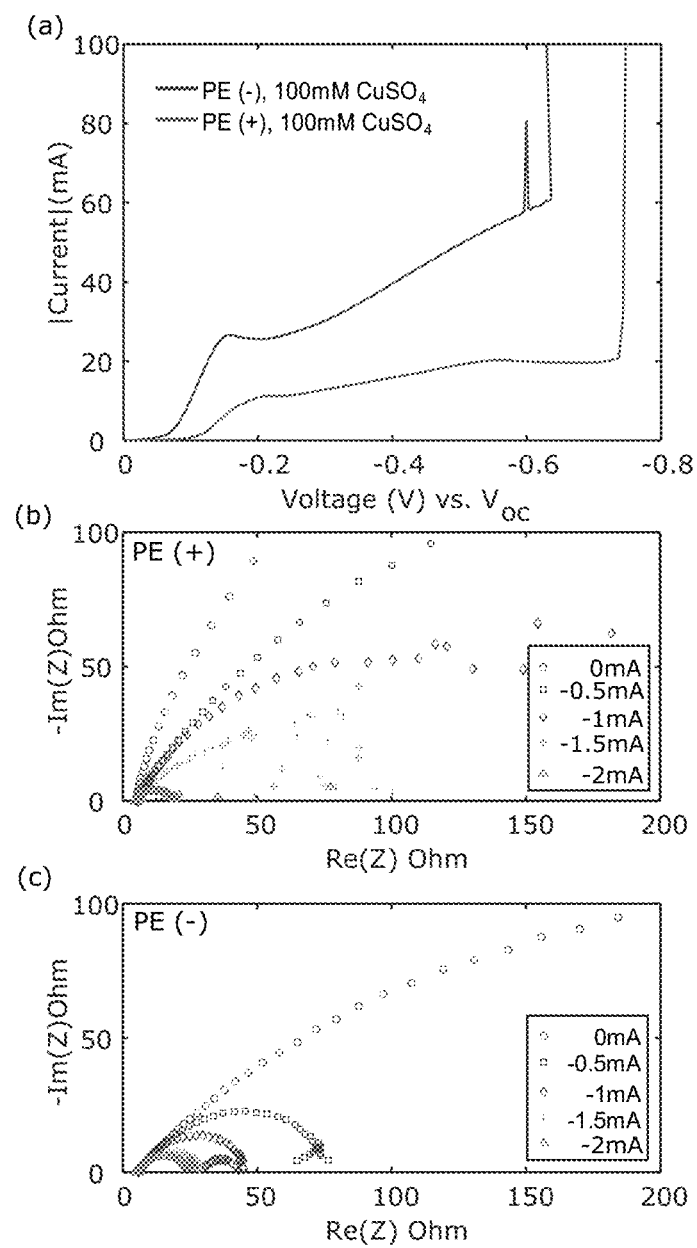
FIG. 22: Linear sweep voltammetry of Celgard K2045 (a) positive and negative membranes of exposed area 1.327 $cm^2$ between two Cu electrodes in 100 mM $CuSO_4$ at 2 mV/s. Nyquist plot of the Galvano electrochemical impedance spectroscopy of Celgard K2045 (b) positive and (c) negative membranes with the same cell configuration as that of voltammetry.

As in other systems with deionization shock waves, it can be more stable to control the current rather than the voltage, so we perform galvano-electrochemical impedance spectroscopies (GEIS) for PE (+) and PE (−) membranes, in FIGS. 22b and 22c, at different direct current biases with alternating currents of 10 μA from 100 kHz to 100 mHz. When applying no dc-bias, the impedance for both cases exhibits a similar response, devoid of any diffusional resistance. When applying a dc-bias, the Warburg-like arc for PE (−) shrinks as the current increases. In contrast, as a result of ion blocking by surface conduction in PE (+), the low frequency response becomes noisy. This may also indicate effects of electro-osmotic surface convection, mostly likely around connected loops in the porous network, which could serve to bypass the blocked surface conduction pathways in PE(+) and lead to the observed dendrite penetration. In any case, it is clear that the positive and negative membranes exhibit distinct low frequency responses with increasing dc-bias, which indicates a significant difference in the mass-transfer mechanism for Cu$^{2+}$ associated with the surface charge of the porous medium.

Figure 23:
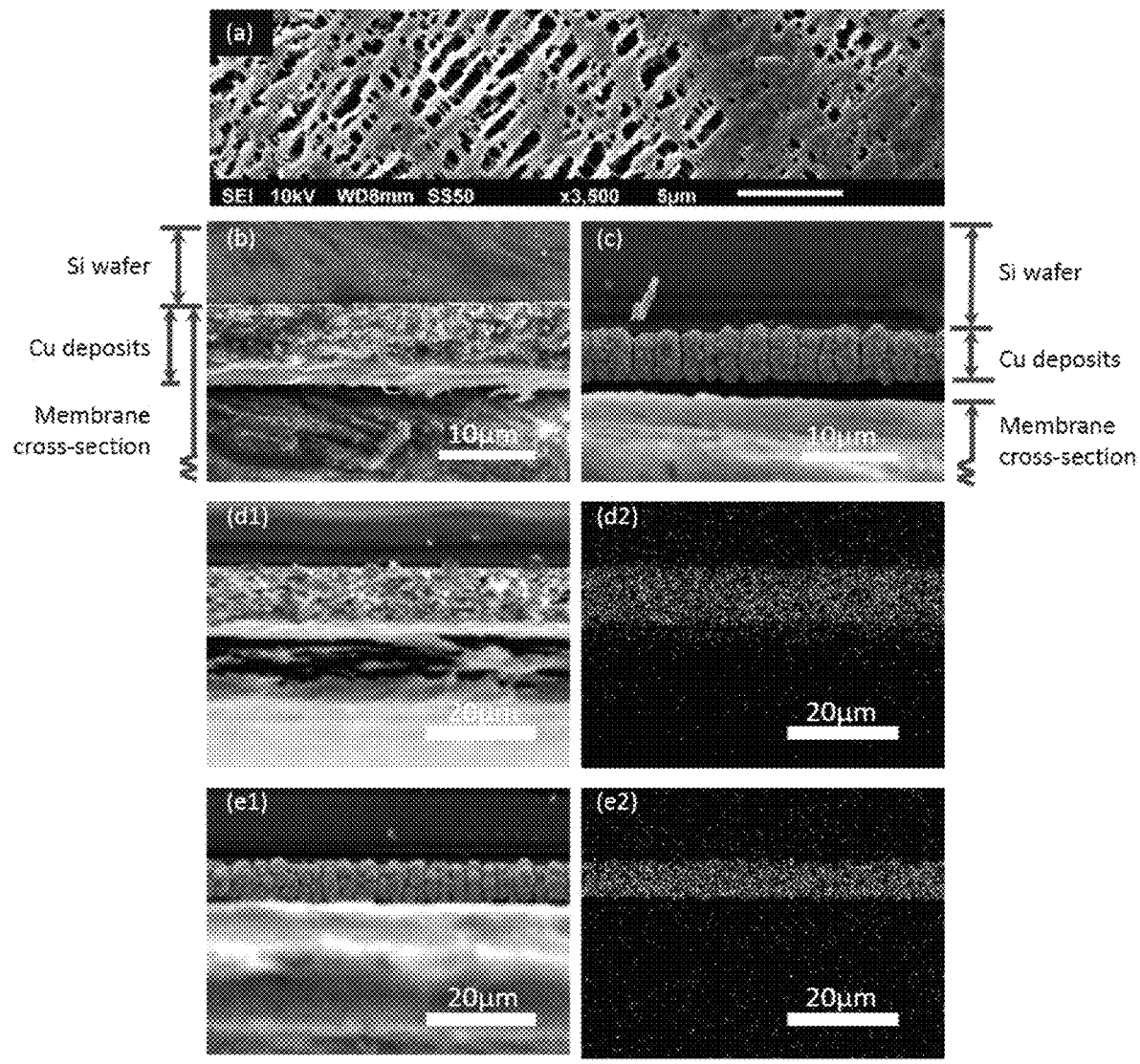
FIG. 23: (a) SEM image of a random porous polyethylene membrane (Celgard K2045). SEM images of the cross section of a (b) positively and negatively (c) charged polyethylene membrane after chronopotentiometry in 100 mM of $CuSO_4$ at a current of −20 mA for 2000 s. EDS mapping analysis of the corresponding (d) PE (−) and (d) PE (+) membranes. The images before the EDS mapping (d1) and (e1) as well as the corresponding mapping of Cu element (d2) and (e2).

To further support the electrochemical evidence for surface conduction controlled growth, SEM and EDS mapping analyses are carried out to examine the morphological differences between copper electrodeposits in the positive and negative polyethylene membranes. The surface of a random porous membrane before electrodeposition is shown in FIG. 23a. After 2000 seconds of galvanostatic deposition of copper onto a silicon wafer (with a thin layer of copper) in 100 mM CuSO$_4$, two distinct cross-sectional morphologies are observed, depending only on the surface charge of the membrane. In the case of PE (−), in FIGS. 23b and 23d, a dense copper film (approx. 8 μm thick) is observed within the membrane. Due to the existence of denser copper within the upper portion of the membrane, the lower portion of the membrane beneath the film, without any copper deposits, is tapered, deformed, and torn away when the cell is taken apart for imaging. In contrast, a layer of porous copper grown directly on the wafer is observed for PE (+), in FIGS. 23c and 23e. The whole membrane beneath the copper layer is partially separated from the wafer/copper complex since no copper is deposited into the membrane to provide any adhesion. These morphological discrepancies are consistent with the growth modes described in FIG. 18, where the negatively charged membrane supports the growth of uniform metal-matrix composite, while the positively charged membrane blocks metal penetration.

This work provides fundamental insights into the physics of pattern formation in porous media. It has been shown that the surface charge and microstructure of porous separators can strongly influence the morphology of copper electrodeposition, which has been studied for decades in physics as the prototypical case of unstable diffusion-limited growth in free solutions. For the first time, there is a direct observation of the suppression of dendritic instability at high rates, exceeding diffusion limitation. With negative surface charge, uniform metal growth is stabilized behind a propagating deionization shock, and reversible cycling is possible. Under the same conditions with positive surface charge, dendrites are blocked from penetrating the medium, and at high rates the growth becomes unstable and cannot be cycled.

Besides its fundamental interest, shock electrodeposition may find applications in energy storage and manufacturing. High-rate rechargeable metal batteries could be enabled by charged porous separators or charged composite metal electrodes. The rapid growth of dense, uniform metal electrodeposits in charged porous media could also be applied to the fabrication of copper or nickel metal matrix composites for abrasives or wear-resistant coatings.

Experimental Methods

Two copper (Cu) disk electrodes (diameter 13 mm, thickness 2 mm) are used as the working and counter electrodes. Electrode polishing consists of grinding by fine sand paper (1200, Norton) followed by 3.0 µm alumina slurry (No. 50361-05, Type DX, Electron Microscopy Sciences) and thorough rinsing with purified water. All chemicals including Polydiallyldimethylammonium chloride (pDADMAC, 100,000~200,000 $M_w$), (poly(styrenesulfonate) (PSS, 70000 $M_w$), copper sulfate ($CuSO_4$), sodium chloride (NaCl), and sodium hydroxide (NaOH) are purchased from Aldrich and used without further purification. Ultrapure deionized water is obtained from Thermo Scientific (Model No. 50129872 (3 UV)). Cellulose nitrate (CN) membranes (pore diameter 200~300 nm, porosity 0.66-0.88, thickness 130 µm, diameter 47 mm) are purchased from Whatman. Polyethylene membranes (K2405) with a pore size of 50 nm, a porosity of 47% and a thickness of 20 µm, is obtained from Celgard.

The surface charge of several CN membranes is modified by layer-by-layer (LBL) method of charged polyelectrolytes. Polydiallyldimethylammonium chloride (pDADMAC) is directly deposited on the membrane to make a positive surface charge, CN(+). For this, the bare CN is immersed in polycation solution (1 mg/mL pDADMAC in 20 mM NaCl at pH 6) for 30 min. Then, the membrane is thoroughly rinsed with purified water by three times (10 min for each) to remove unattached polyelectrolyte. Negatively charged CN(−) is obtained by coating negative polyelectrolytes (poly(styrenesulfonate), PSS) on the pDADMAC-coated CN. In this step, the pDADMAC coated CN is immersed in polyanion solution (1 mg/mL PSS in 20 mM NaCl at pH 6) for 30 min and followed by the same cleaning procedure. The polyelectrolytes coated CN membranes are stored in $CuSO_4$ solution.

The surface charge of PE membranes are modified using the same LBL procedures described above. Bare PE membranes are air-plasma treated for 10 minutes before being immersed in pDADMAC solution for 12 hours to make the positively charged membrane (PE (+)). A rinsing procedures (3 times and 30 mins each) with deionized water is needed to remove any unattached polyelectrolyte. For the negatively charged PE membrane, thoroughly rinsed PE (+) membranes are immersed in PSS for 12 hours, followed by the same rinsing procedure as that of the PE (+) membrane. The surface-modified PE membranes are stored in DI water. Membranes are soaked in $CuSO_4$ solution 12 hours before cell-assembly.

The experimental setup is as follow: The CN or PE membrane is clamped between two Cu disk electrodes (diameter 13 mm) under constant pressure, where copper electrodeposits at the cathode and dissolves at the anode. For SEM images, Cu sputtered Si wafer (1.0 cm×1.5 cm) is used as a cathode. In order to prevent the evaporation of the binary electrolyte solution inside the CN or PE membrane, the electrochemical cell is immersed in a beaker containing the same electrolyte. All electrochemical measurements are performed with a potentiostat (Reference 3000, Gamry Instruments). The morphology and composition of electrodeposited Cu films are confirmed by scanning electron microscopy (SEM) with energy-dispersive spectroscopy (EDS) X-ray detector (6010LA, JEOL) at 15 kV accelerating voltage.

Chronopotentiometry and Suppression of Dendrites

Figure 24:
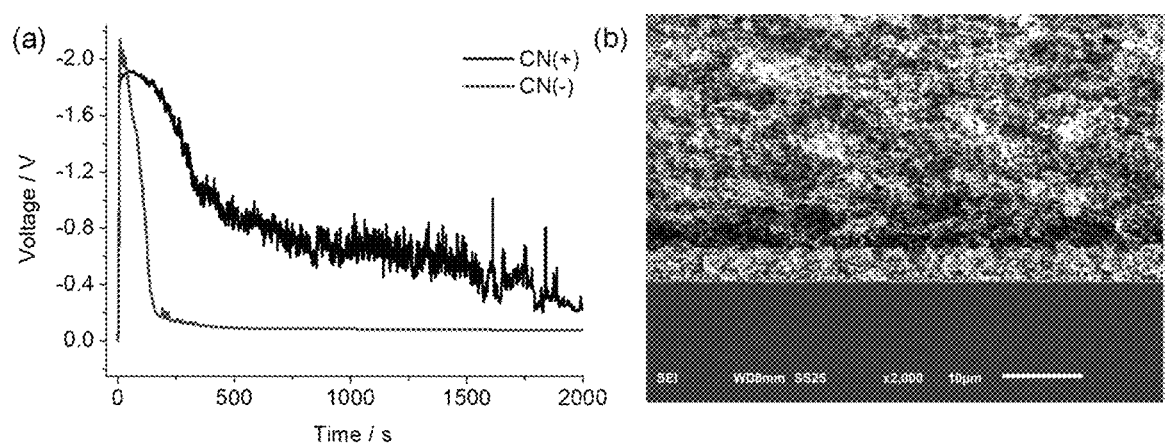
FIG. 24: (a) Chronopotentiometry data for CN(+) and CN(−) membranes at −5 mA for 2000 s in 10 mM $CuSO_4$. (b) SEM image of a uniform Cu film in CN(−) grown by shock electrodeposition during OLC.
Figure 25:
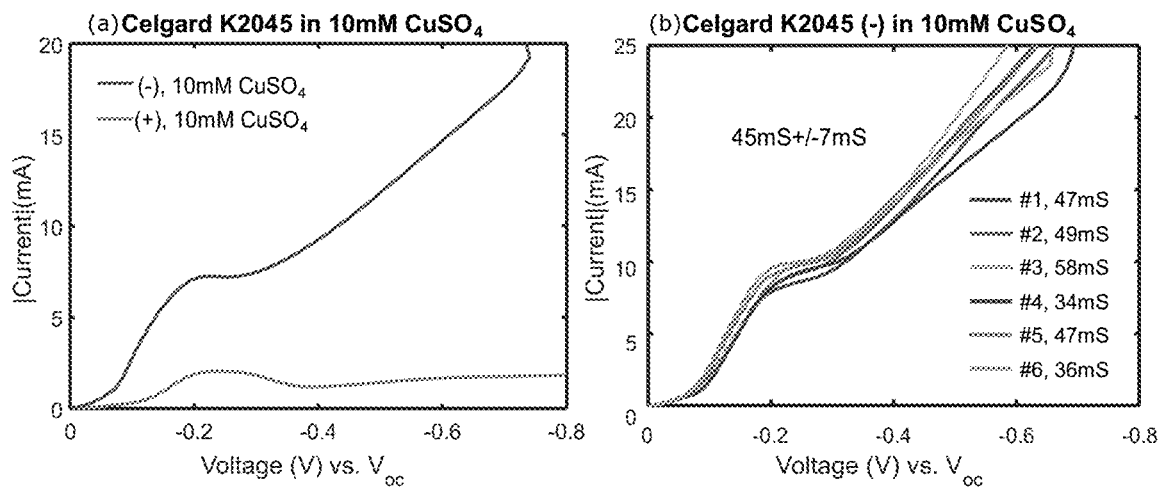
FIG. 25: (a) LSV of PE (+) and (−) membrane between two Cu electrodes in 10 mM $CuSO_4$ solution. (b) LSV of PE (−) membrane between two Cu electrodes in 10 mM $CuSO_4$ solution.

The strong dependence of OLC electrodeposition to surface charge is easily detected by chronopotentiometry in FIG. 25a. When constant OLC, −5 mA, is applied in 10 mM $CuSO_4$ solution, CN(+) shows unstable voltage variation, which we attribute to the blocking of cation transport in front of the cathode by the reverse SC of $SO_4^{2-}$ counter-ions, interrupted by electro-osmotic flows and dendrite nucleation. Large electric fields in the depletion region also drive side reactions such as water electrolysis, consistent with observed gas bubbles. In stark contrast, CN(−) maintains low voltage around −100 mV, as expected since the SC of $Cu^{2+}$ counter-ions sustains electrodeposition under OLC regime. More importantly, the electrodeposited Cu film in CN(−) is perfectly uniform, as shown in the SEM image of FIG. 24b, consistent with the theoretical motivation above, based on the stability of deionization shock propagation ahead of the growth.

Linear Sweep Voltammetry of PE Membranes in 10 mM $CuSO_4$

In some embodiments, there is an observation of similar current-voltage response of surface-modified PE membranes in 10 mM $CuSO_4$ solution as those of PE membranes in 100 mM $CuSO_4$ solution. The nonlinear effect of surface conduction dominants the charge transport as the cathode is polarized beyond −0.15V. As evident in FIG. 25a, a drastic difference between the current-voltage relations of PE (+) and (−) membranes further supports the proposition of surface charge sensitivity. Seven copper cells with PE (−) membranes were individual assembled and examined to testify the repeatability of our methodology. As evident in in FIG. 25b, repeatability can be achieved with stringent LBL-coating procedure as well as cell-assembly process to further validate our proposition of surface conduction phenomenon.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the coupling structures and diffractive optical elements disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the coupling structures and diffractive optical elements disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or"

should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An electrode for a conversion battery, the electrode comprising:
   a metal; and
   an electrically-insulating porous membrane in direct contact with a surface of the metal;
   wherein:
      the electrically-insulating porous membrane is coated with a polyelectrolyte;
      the metal is at least one of a pure metal or a metal alloy;
      the electrically-insulating porous membrane includes a plurality of pores, each pore of the plurality of pores having a pore wall;
      the polyelectrolyte provides a surface charge on respective pore walls of the plurality of pores; and
      during operation of the conversion battery, the surface charge tunes an over-limiting current and an electrodeposition morphology of the conversion battery.

2. The electrode of claim 1, wherein the metal is Na, Li, or K.

3. The electrode of claim 2, wherein the metal is Li.

4. The electrode of claim 1, wherein the polyelectrolyte is a negative polyelectrolyte.

5. The electrode of claim 1, wherein the polyelectrolyte is a positive polyelectrolyte.

6. A rechargeable conversion battery comprising the electrode of claim 1.

7. The electrode of claim 4, wherein the negative polyelectrolyte is a polymeric anion.

8. The electrode of claim 7, wherein the polymeric anion is poly(acrylic acid), poly(methacrylic acid), polystyrenesulfonate, copolymers thereof, and combinations thereof.

9. The electrode of claim 5, wherein the positive polyelectrolyte is a polymeric cation.

10. The electrode of claim 9, wherein the polymeric cation is a poly(allylamine) salt, a polystyrene amine salt, a polydiallyldimethylamine salt copolymers thereof, and combinations thereof.

11. The electrode of claim 1, wherein the surface charge of the coated electrically-insulating porous membrane ranges from about $-0.2$ to about $-0.8$ $e/nm^2$.

12. An electrochemical device, comprising:
    a substrate; and
    an electrically-insulating porous membrane in direct contact with the substrate, the electrically-insulating porous membrane having a plurality of pores, each pore in the plurality of pores having a pore wall that is coated with a polyelectrolyte multilayer,
    wherein:
       the polyelectrolyte multilayer provides at least one surface charge on respective pore walls of each pore in the plurality of pores; and
       when the electrochemical device is operated, the at least one surface charge tunes an over-limiting current and an electrodeposition morphology.

13. The electrochemical device of claim 12, further comprising:
    a plurality of metal ions disposed proximate to the electrically-insulating porous membrane,
    wherein the polyelectrolyte multilayer has the same polarity as the plurality of metal ions thereby suppressing the penetration of dendrites formed by electrodeposition of the plurality of metal ions when at least one of an electric current or a voltage is applied to the electrochemical device.

14. The electrochemical device of claim 12, further comprising:
    a plurality of metal ions disposed proximate to the electrically-insulating porous membrane,
    wherein the polyelectrolyte multilayer has the opposite polarity from the plurality of metal ions thereby increasing transport of the plurality of metal ions through the electrically-insulating porous membrane and causing electrodeposition of the plurality of metal ions to be substantially uniform when at least one of an electric current or a voltage is applied to the electrochemical device.

15. The electrochemical device of claim 12, wherein the substrate is a glass fiber separator.

16. The electrochemical device of claim 12, further comprising:
a second electrode located on a second side of the electrically-insulating porous membrane opposite a first side; and
an electrolyte disposed within the plurality of pores of the electrically-insulating porous membrane, the electrolyte comprising a plurality of metal ions,
wherein:
the substrate is a first electrode located on the first side of the electrically-insulating porous membrane, the first and second electrodes being configured to conduct an electric current;
the at least one surface charge of the pore wall is either positive or negative;
transport of the plurality of metal ions through the plurality of pores of the electrically-insulating porous membrane is blocked when the surface charge is positive and the electric current has a magnitude greater than or equal to a limiting current of the electrochemical device; and
transport of the plurality of the metal ions through the plurality of pores of the electrically-insulating porous membrane corresponds to an over limiting current when the surface charge is negative and the electric current has a magnitude greater than or equal to the limiting current.

17. The electrochemical device of claim 16, wherein:
the electrochemical device is a rechargeable battery; and
the electrically-insulating porous membrane only physically contacts the first electrode.

18. The electrochemical device of claim 16, wherein the electrically-insulating porous membrane is patterned to have one or more first regions where the at least one surface charge is positive and one or more second regions where the at least one surface charge is negative.

19. The electrode of claim 1, wherein the electrically-insulating porous membrane comprises a ceramic material.

20. The electrode of claim 1, wherein the surface of the metal in direct contact with the porous membrane is non-perforated.

21. The electrode of claim 1, wherein the polyelectrolyte does not completely fill respective pores in the plurality of pores.

22. The electrode of claim 12, wherein the polyelectrolyte multilayer is patterned on the electrically-insulating porous membrane so that the electrically-insulating porous membrane has one or more first regions where the at least one surface charge is positive and one or more second regions where the at least one surface charge is negative.

* * * * *